United States Patent [19]

Engel et al.

[11] Patent Number: 4,722,059

[45] Date of Patent: Jan. 26, 1988

[54] PROGRAMMED OVERCURRENT PROTECTION CONTROL APPARATUS AND METHOD OF OPERATING THE SAME

[75] Inventors: Joseph C. Engel, Monroeville Boro; Leonard C. Vercellotti, Oakmont; Richard A. Johnson; Seymour Salowe, both of Murrysville; William R. Verbanets, Jr., Pittsburgh, all of Pa.

[73] Assignee: Westinghouse Electric Corp., Pittsburgh, Pa.

[21] Appl. No.: 725,195

[22] Filed: Apr. 19, 1985

[51] Int. Cl.⁴ .................. H02H 3/08; G06F 15/46
[52] U.S. Cl. ..................... 364/483; 364/481; 361/94; 361/96
[58] Field of Search ........... 364/481, 483, 492; 361/79, 87, 63, 93–97; 363/74

[56] References Cited

U.S. PATENT DOCUMENTS

| | | | |
|---|---|---|---|
| 3,946,281 | 3/1976 | Llona et al. | 361/96 |
| 4,223,365 | 9/1980 | Moran | 361/96 |
| 4,245,318 | 1/1981 | Eckart et al. | 364/481 |
| 4,250,532 | 2/1981 | Davis | 361/96 |
| 4,276,605 | 6/1981 | Okamoto et al. | 364/481 |
| 4,402,028 | 8/1983 | Udren | 361/87 |
| 4,423,459 | 12/1983 | Stich et al. | 364/483 |
| 4,541,058 | 9/1985 | Andow et al. | 364/483 |
| 4,623,967 | 11/1986 | Naimer | 364/483 |

Primary Examiner—Felix D. Gruber
Assistant Examiner—Brian M. Mattson
Attorney, Agent, or Firm—G. H. Telfer

[57] ABSTRACT

Programmed overcurrent protection control apparatus with selectable time-overcurrent operation to govern the interruption of current through at least one power line associated with either a ground phase or a power phase of a power system network is disclosed. A programmed processor is included to derive an overcurrent time-to-trip in accordance with sampled measurement current values of the power line and selected derivation constants stored in a memory look-up table. The derivation constants are selected from the look-up table based on derivation parameters which may be set and read by the programmed processor from time to time. The programmed processor utilizes the selected derivation constants to derive the time-to-trip over a number of predetermined time intervals during which the overcurrent condition persists. An alternate overcurrent time-to-trip relationship utilizing different derivation parameters selected from the look-up table may be utilized for the conditions in which overcurrent exists in an initial predetermined range. In some situations, both of the derivation relationships may be used concurrently to derive the overcurrent time-to-trip.

25 Claims, 22 Drawing Figures

PROGRAMMED OVERCURRENT PROTECTION CONTROL APPARATUS AND METHOD OF OPERATING THE SAME

COPENDING PATENT APPLICATIONS

U.S. patent application with Ser. No. 725,050 filed on Apr. 19, 1985 copending with the instant application is incorporated by reference herein for providing a description of a supervisory circuit suitable for use in the preferred embodiment; and U.S. Pat. No. 4,626,831 issued on Dec. 2, 1986 is incorporated by reference herein for providing a description of an analog multiplexer and prescaler suitable for use in the preferred embodiment, both of the aforementioned applications being assigned to the same assignee as the instant application.

BACKGROUND OF THE INVENTION

The present invention relates to overcurrent protection apparatus, in general, and more particularly to such apparatus under programmed control with selectable time-overcurrent operation to govern the interruption of current through at least one power line associated with either a ground phase or a power phase of a power system network.

Examples of types of overcurrent protection apparatus which operate with trip time delay characteristics in response to a sensed overcurrent condition in a power line include protective relays, automatic reclosures, circuit breakers and the like. Apparatus of this type generally protect electrical transmission and distribution systems and their connected loads from damage due to overcurrents by governing the interruption of current through their associated power lines in accordance with some time-to-trip vs. overcurrent coordinated relationship or predefined family of curves. Typically, the characteristics of these time-overcurrent curve families have been implemented using electromechanical, magnetic and thermal control circuits. Hence, once a particular time-overcurrent operation was characterized, it was intended to remain fixed and if a change in characterization was required usually some mechanical adaptation was needed like physically interchanging or adding special elements, for example.

Recently, electronic overcurrent protection control apparatus, and more particularly, electronic apparatus including programmed digital signal processors have been developed to provide greater functional flexibility in altering apparatus characterization with regard to time delayed current interruption control. Examples of programmed overcurrent protection control apparatus are found in the following U.S. Pat. Nos.:

4,446,498; "Electronic Control System For Overload Relay Or The Like"; issued May 1, 1984 to F. A. Stitch and assigned to Siemens-Allis, Inc.;

4,432,031; "Method For Overcurrent Protection"; issued Feb. 14, 1984 to W. J. Premerlani and assigned to General Electric Company;

4,377,837; "Circuit Interrupter With Over Temperature Trip Devise"; issued Mar. 22, 1983 to J. J. Matsko et al. and assigned to Westinghouse Electric Corp.;

4,377,836; "Circuit Interrupter With Solid State Digital Trip Unit And Positive Power-Up Feature"; issued Mar. 22, 1983 to R. T. Elms et al. and assigned to Westinghouse Electric Corp.;

4,371,947; "ROM Controlled Protective Relay System For Power Transmission Network"; issued Feb. 1, 1983 to Norio Fujisawa and assigned to Tokyo Chirbara Denki Kabushiki Kaisha;

4,339,802; "Digital Protective Relaying Device"; issued July 13, 1982 to M. Yamaura et al. and assigned to Tokyo Chirbara Denki Kabushiki Kaisha;

4,328,551; "Apparatus And Method For Protection Of Electric Power Transmission Lines And The Like"; issued May 4, 1982 to M. Yamaura et al. and assigned to Tokyo Chirbara Denki Kabushiki Kaisha;

4,272,816; "Overcurrent Protecting Apparatus"; issued June 9, 1981 to Y. Matsumato and assigned to Tokyo Chirbara Denki Kabushiki Kaisha.

While the aforementioned exemplary references are all directed to various novel methods and apparatus related to programmed digital signal processor control of overcurrent protection in power system networks, none of the above references appear to provide for both accurate characterization of the predefined time-to-trip vs. overcurrent curve families and the selectability of time overcurrent operation. The present invention is directed to programmed overcurrent protection control apparatus having aspects which are intended to fill these aforementioned gaps by providing accurate characterization of predefined families of time-overcurrent curves with a common programmed relationship based on settable parameters and the convenient setability of the parameters to select the curve family characterization suitable for the particular duty to which the overcurrent protection apparatus is being applied using the common programmed relationship.

SUMMARY OF THE INVENTION

In accordance with the present invention, programmed overcurrent protection control apparatus is adapted for use in a power system including at least one power line to govern the interruption of current through the power line based on a derived overcurrent time-to-trip associated with an overcurrent condition of the power line. The control apparatus comprises a programmed digital signal processor and memory means, coupled to the programmed processor, for storing a plurality of digitally coded signals representative of predetermined derivation constants. Further provided is means governed by the program processor to sample a current signal, representative of measured current of the power line, at first predetermined times and to digitize the sampled current signals, a frequency cycle of the power line current including a plurality of first predetermined times. The programmed processor is operative over predetermined time intervals to derive for each predetermined time interval a digital signal, representative of a current value $I_m$ of a frequency cycle of the current contemporaneous with the corresponding predetermined time interval m, from the sampled current signals digitized over the corresponding predetermined time interval. The programmed processor is further operative at second predetermined times corresponding to the predetermined time intervals to read certain ones of a plurality of derivation parameter settings. The program processor is operative to select, at other times, certain of the digitally coded derivation constants from the memory means corresponding to the read parameter settings associated with the other times. Still further, the programmed processor is operative, in response to a detection of an overcurrent condition, to derive an overcurrent time-to-trip based on the following relationship:

$$\left[ \sum_{m=1}^{N-G \cdot C2} (I_m - C1)^p \right] \geq G \cdot C3,$$

where m from 1 to N−G·C2 represent the predetermined time intervals during which said detected overcurrent condition persists; where G, P, C1, C2 and C3 represent digitally coded derivation constants based on said read parameter settings for each corresponding predetermined time interval m; where N represents the number of predetermined time intervals which may elapse for the time-to-trip and G·C2 represents a minimum number of predetermined time intervals for the time-to-trip; where $I_m$ represents the digital current value signal derived for the corresponding predetermined time interval m. The control apparatus further includes means for governing the interruption of current through the power line if the overcurrent condition persists for the duration of the time-to-trip derivation.

In accordance with another aspect of the present invention, the programmed processor is operative, in response to the detection of an overcurrent condition, to determine if the digital current value signal derived for the predetermined time interval corresponding to the detected overcurrent condition is within an initial overcurrent range and if said determination is affirmative, to derive an overcurrent time-to-trip based on the following relationship:

$$\left[ \sum_{m=1}^{N} (I_m - C5) \right] \geq G \cdot C4,$$

where G and C4 represent digitally coded derivation constants based on said read parameter settings for said corresponding predetermined time interval, and C5 represents a fixed constant.

The programmed overcurrent protection control apparatus described hereabove is further adaptable for use in a three-phase power system including at least three power lines to govern the interruption of current through the power lines based on a similar derived overcurrent time-to-trip. In one embodiment, the first, second and third current measurement signals respectfully representative of currents measured from the power lines are sampled and digitized at first predetermined times and first, second and third digital signals, each representative of a current value $I_m$ of a frequency cycle of its respective current contemporaneous with a corresponding predetermined time interval m, are derived for each predetermined time interval from their respective sampled current measurement signals digitized over the corresponding predetermined time interval. Accordingly, an overcurrent condition is detected by the programmed processor from the derived first, second and third digital current value signals wherein the programmed processor derives the overcurrent time-to-trip based on the foregoing relationships using the detected overcurrent digital current value signal derived for the corresponding predetermined time interval.

In accordance with another aspect of the present invention, a method is provided for operating the foregoing described control apparatus including the step of operating the programmed processor in response to the detection of an overcurrent signal to derive an overcurrent time-to-trip by: (1) accumulating the quantities $(I_m - C1)^p$ for each predetermined time interval m during the time that the overcurrent condition persists, until the value of the accumulated quantities becomes greater than or equal to $G \cdot K_1'$, and (2) delaying for $G \cdot L'$ additional predetermined time intervals for which the overcurrent condition persists, where G, p, C1, $K_1'$ and L' represent derivation constants based on the read parameter settings for each corresponding predetermined time interval m, and the step of governing the interruption of current through the power line if the overcurrent condition persists for the duration of the time-to-trip derivation.

In addition, if the derived digital current value signal $I_m$ for an overcurrent condition is determined to be within an initial overcurrent range, the programmed processor is operated to suspend the foregoing described derivation of the time-to-trip and to derive the overcurrent time-to-trip by accumulating the quantities $(I_m - C2)$ for each predetermined time m during the time the overcurrent condition persists until the value of the accumulated quantities becomes greater than or equal to $G \cdot K_2'$, where $K_2'$ represents a derivation constant based on the read parameter settings for each corresponding time interval m and C2 represents a fixed constant.

In one method embodiment, if the derived digital current value signal $I_m$ is detected outside the initial overcurrent range, the programmed processor is operated to set a variable digital signal $I_{m2}$ to the upper boundary current value of the initial overcurrent range, to derive the overcurrent time-to-trip in accordance with the latter of the two foregoing methods using $I_{m2}$ and to perform both of the foregoing methods concurrently. In another embodiment, the programmed processor is operated under normal current conditions to set the values of the accumulated quantities in the foregoing methods to zero. In still another embodiment, the programmed processor is operated under normal current conditions to decrement the values of the accumulated quantities with respective constant values at each predetermined time interval until a value of a corresponding accumulated quantity reaches zero or an overcurrent condition arises.

DESCRIPTION OF THE PREFERRED EMBODIMENT ARCHITECTURE AND OPERATION OF THE CONTROL APPARATUS

Figure 1:
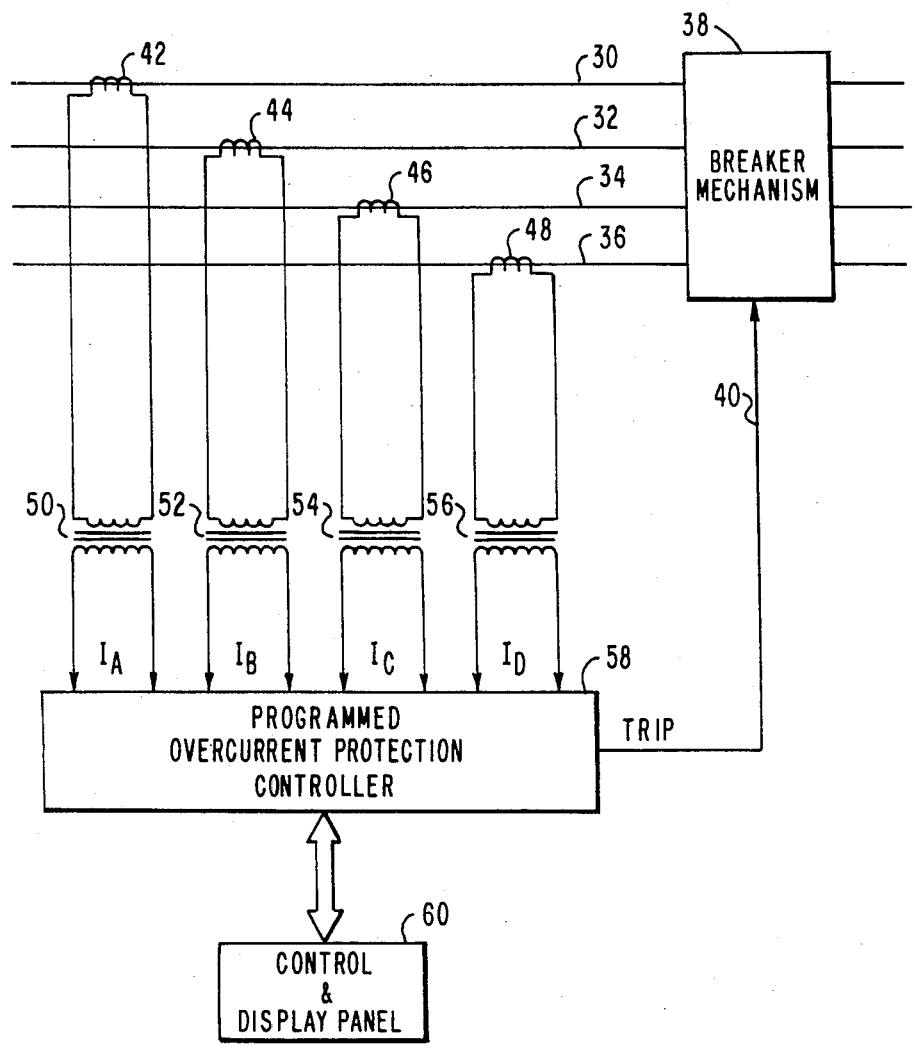
FIG. 1 is a block diagram schematic of a portion of a power system illustrating an environment for the use of a programmed overcurrent protection controller and associated panel suitable for embodying the principles of the present invention.

Referring to FIG. 1, the lines 30, 32 and 34 represent power lines for three phases, denoted as A, B, and C, of a power system network and the line 36 represents a ground power line of the power system network. A breaker mechanism depicted at 38 is coupled to the power lines 30, 32, 34 and 36 to interrupt the current through the aforementioned power lines when activated by a trip signal 40. In the present embodiment, current transformers 42, 44, 46 and 48 are coupled to and used to measure the current of their respective power lines 30, 32, 34 and 36. At times, auxiliary transformers 50, 52, 54 and 56 may be used to couple the current measurement signals of the current transformers 42, 44, 46 and 48, respectively, to a programmed overcurrent protection controller 58. The signals $I_A$, $I_B$, $I_C$, and $I_G$ coupled to the controller 58 from the auxiliary transformers 50, 52, 54 and 56, respectively, are signals representative of the current measurements of the power system phases A, B, C and if appropriate the current of the ground G. In addition, certain parameters may be set and entered in the controller 58 and certain parameters may be displayed from the controller 58 utilizing a control and display panel shown at 60. As will be described in greater detail herebelow, the controller 58 is operative to govern the interruption of current through the power lines 30, 32, 34 and 36 via the trip signal 40 and breaker mechanism 38, based on a derived overcurrent time-to-trip utilizing the current measurement signals $I_A$, $I_B$, $I_C$, and $I_G$ or a portion thereof, and the set parameters entered through the panel 60.

Figure 2A:
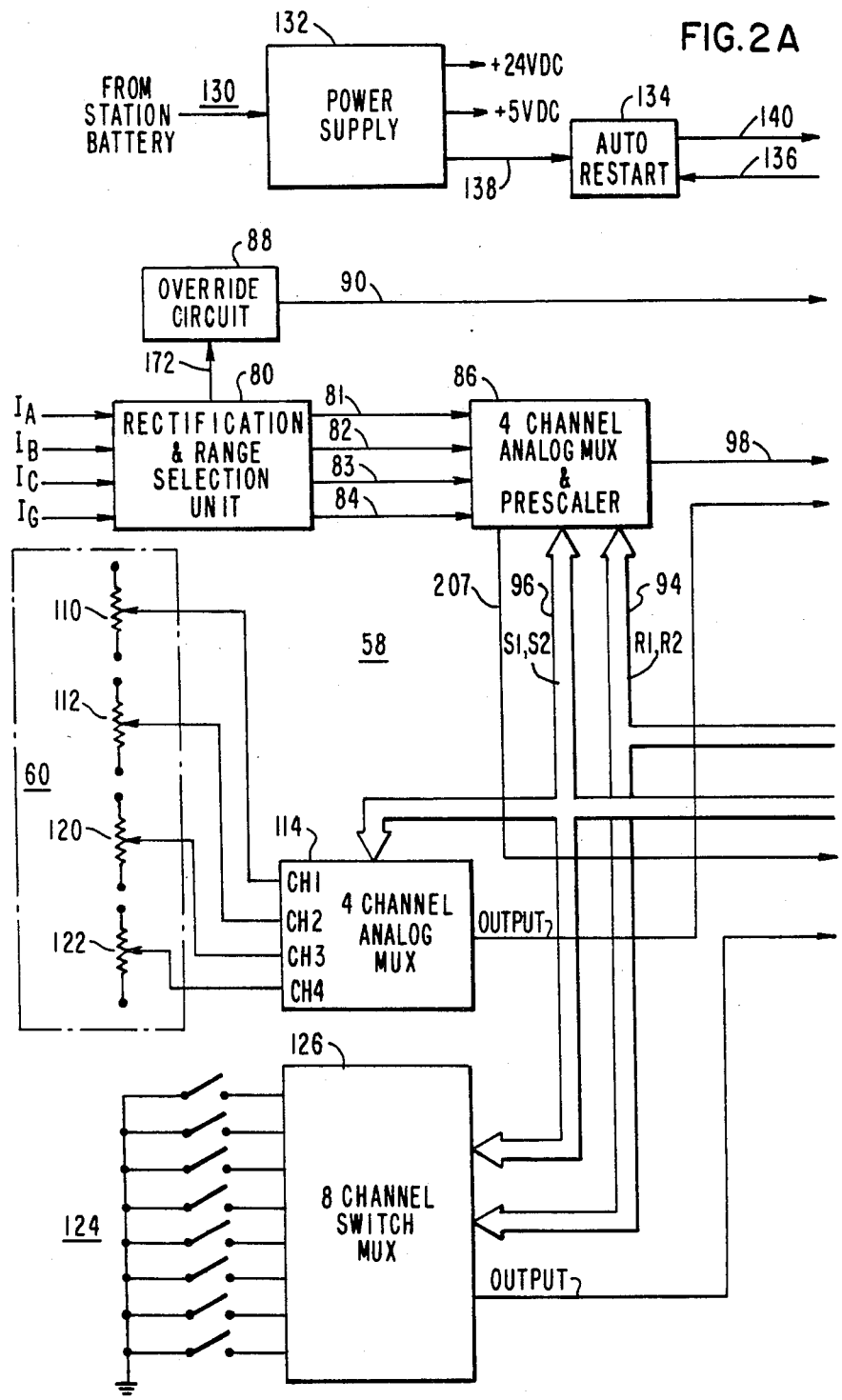
FIGS. 2A and 2B depict programmed control apparatus suitable for use in a power system environment such as that shown in FIG. 1.
Figure 2B:
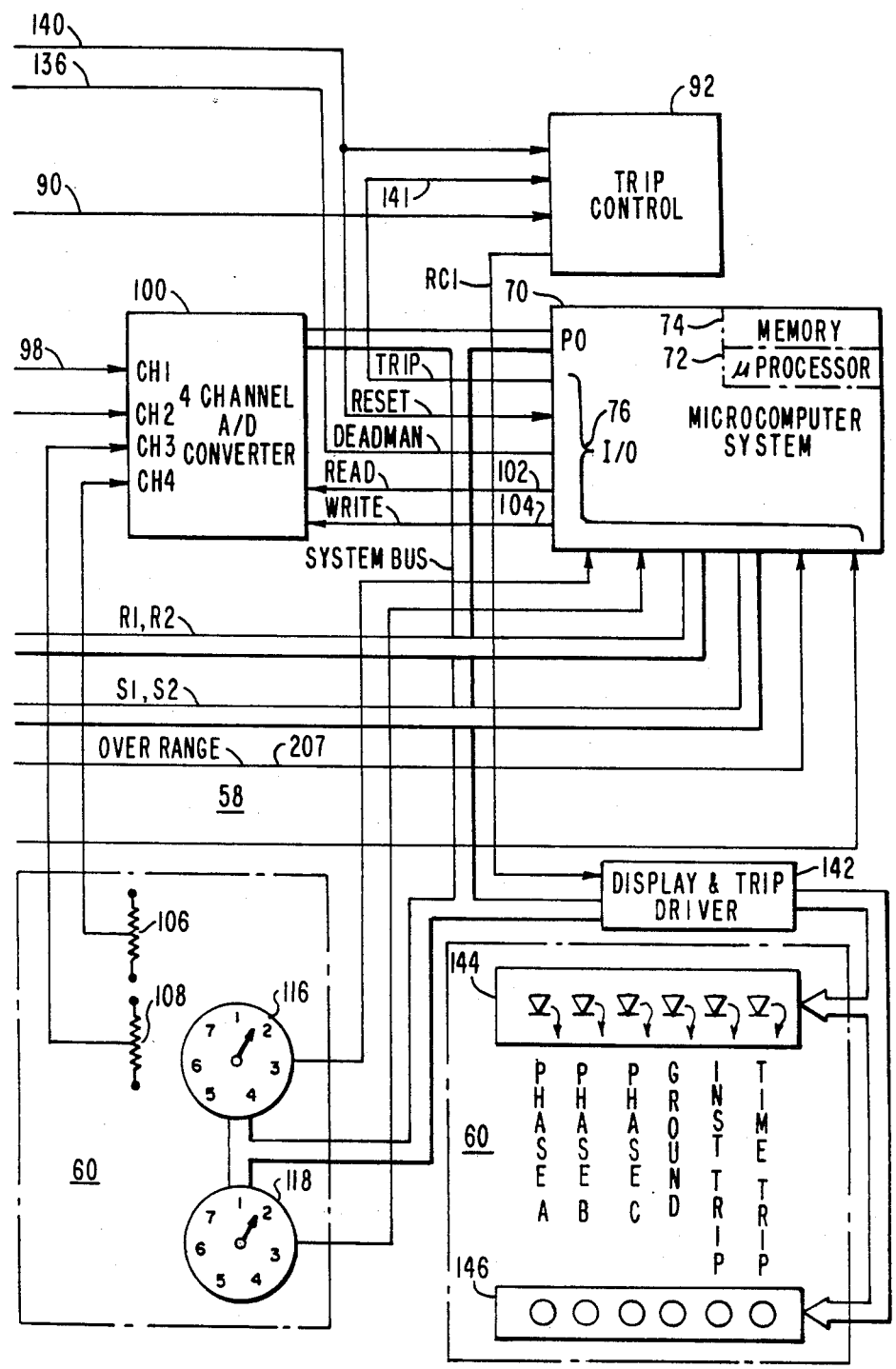

Referring to FIG. 2, in the present embodiment, the controller 58 includes a microcomputer system 70 which may be similar to the type manufactured by Intel Corporation having the Model No. 8051, for example. The microcomputer system 70 which performs the operations of a programmed digital signal processor comprises a microprocessor unit 72, a memory unit 74 and at least one input/output (I/O) unit denoted at 76. The several units of the microcomputer system are conventionally coupled together through a system bus, denoted at PO, which may be used to connect additional peripheral units to the microcomputer system 70 as will be described hereinbelow.

In the present embodiment, the current measurement signals $I_A$, $I_B$, $I_C$, and $I_G$ may be provided to a rectification and range selection unit 80 which will be described in greater detail in connection with the circuit schematic of FIG. 3. The rectified and ranged signals 81 through 84, respectively corresponding to the signals $I_A$, $I_B$, $I_C$ and $I_G$, are provided from the unit 80 to a four channel analog multiplexer and prescaler 86. The unit 80 may also be coupled to an override circuit 88 which is governed by a tripping signal 90 generated from a trip controller 92. The unit 86 is governed by range select lines 94 and channel select lines 96 as provided by the microcomputer system 70 via the I/O portions 76. A selected and ranged signal 98 from the unit 86 is provided to one channel input, CH1, of a four channel analog-to-digital (A/D) converter 100. The operation of the converter 100 is governed by read and write signals provided over signal lines 102 and 104, respectively, from the microcomputer system 70 through the I/O portion 76 thereof. The A/D converter 100 may be similar to the type manufactured by Analog Devices having the Model No. ADC0844CCJ. Sampled and digitized current measurement signal data generated by the converter 100 may be accessed by and provided to the microcomputer system 70 utilizing the conventional address and data lines of the system bus thereof.

Certain parameters used by the microcomputer system 70 in the derivation of the time to trip in response to an overcurrent condition may be entered through the panel 60 as shown in the embodiment of FIG. 1. Some of the parameters like the phase and ground time dials may be entered utilizing conventional panel potentiometers such as that shown at 106 and 108, respectively. Since the potentiometers 106 and 108 produce analog signals, they may be coupled to the A/D converter 100 for sampling and digitization before being provided to the microcomputer system 70 for use therein. Other potentiometer type settings like the phase instantaneous trip and ground instantaneous trip 110 and 112, respectively, may be coupled to the A/D converter 100 through an analog multiplexer unit 114 which may be similar to the type manufactured by Motorola having the Model No. MC14852BCL, for example. Other derivation parameters may be entered using selector switches like that shown at 116 for the phase overcurrent style selection and 118 for the ground overcurrent style selection. The selector switches 116 and 118 may be of the conventional rotary type and interfaced to the microcomputer system 70 using the conventional system bus PO and I/O 76 thereof.

The panel may further contain some spare potentiometers 120 and 122, the settings of which being coupled to the microcomputer system via the analog multiplexer 114 and A/D converter 100 as described hereabove. Channel selection of the multiplexer 114 is accomplished under program control of the microcomputer system 70 utilizing a portion of the selection lines 96. Another set of switches 124 which may be used to set certain parameters and be located either on the panel 60 or within the controller 58 are introduced to the microcomputer system 70 through a channel switch multiplexer 126 which may be of the type manufactured by Motorola having the Model No. MC14051BCL. The selection and data from the multiplexer 126 may be provided to the microcomputer system 70 utilizing the selection lines 94 and 96 and the I/O portion 76.

Moreover, energy may be provided to the controller 58 from a station battery external or internal to the controller 58. A power supply 132 disposed in the controller 58 converts the voltage level of the energy provided by the station battery 130 to various other voltage levels for energizing the circuit elements of the controller 58. Typical voltage levels being regulated by the power supply 132 are 24 volts DC and 5 volts DC, for example. A suitable embodiment for the power supply 132 will be described in connection with FIG. 4 hereinbelow. In addition, an auto restart circuit 134 is disposed in the controller 58 for performing supervisory functions with regard to program execution malfunction in the microcomputer system 70, power on/off conditions, and overvoltage and undervoltage situations. The auto restart circuit 134 is controlled by a signal 136 generated by the microcomputer system 70 periodically and by a signal 138 generated by the power supply circuit 132 and indicative of an undervoltage situation. In response to one of the aforementioned conditions, the auto restart circuit 134 generates a reset signal 140 which governs the program execution of the microcomputer system 70 and is also provided to the trip control unit 92 to inhibit trip governing operations thereof. A trip governing signal 141 may be generated by the microcomputer system 70 and coupled to the trip control unit 92 via I/O 176. The trip control unit 92 and the microcomputer system 70 provide information to the display panel 60 via a display and trip driver conventional circuit 142. Typical information which may be displayed through light emitting diodes 144 or display magnetic flip-flops 146, for example, are the type of trip, instantaneous versus delay time, and the phase or ground power line over which the trip has occurred. In the following paragraphs, certain of the circuit elements of the controller 58 will be described in greater detail in connection with the FIGS. 3 through 6.

Figure 3:
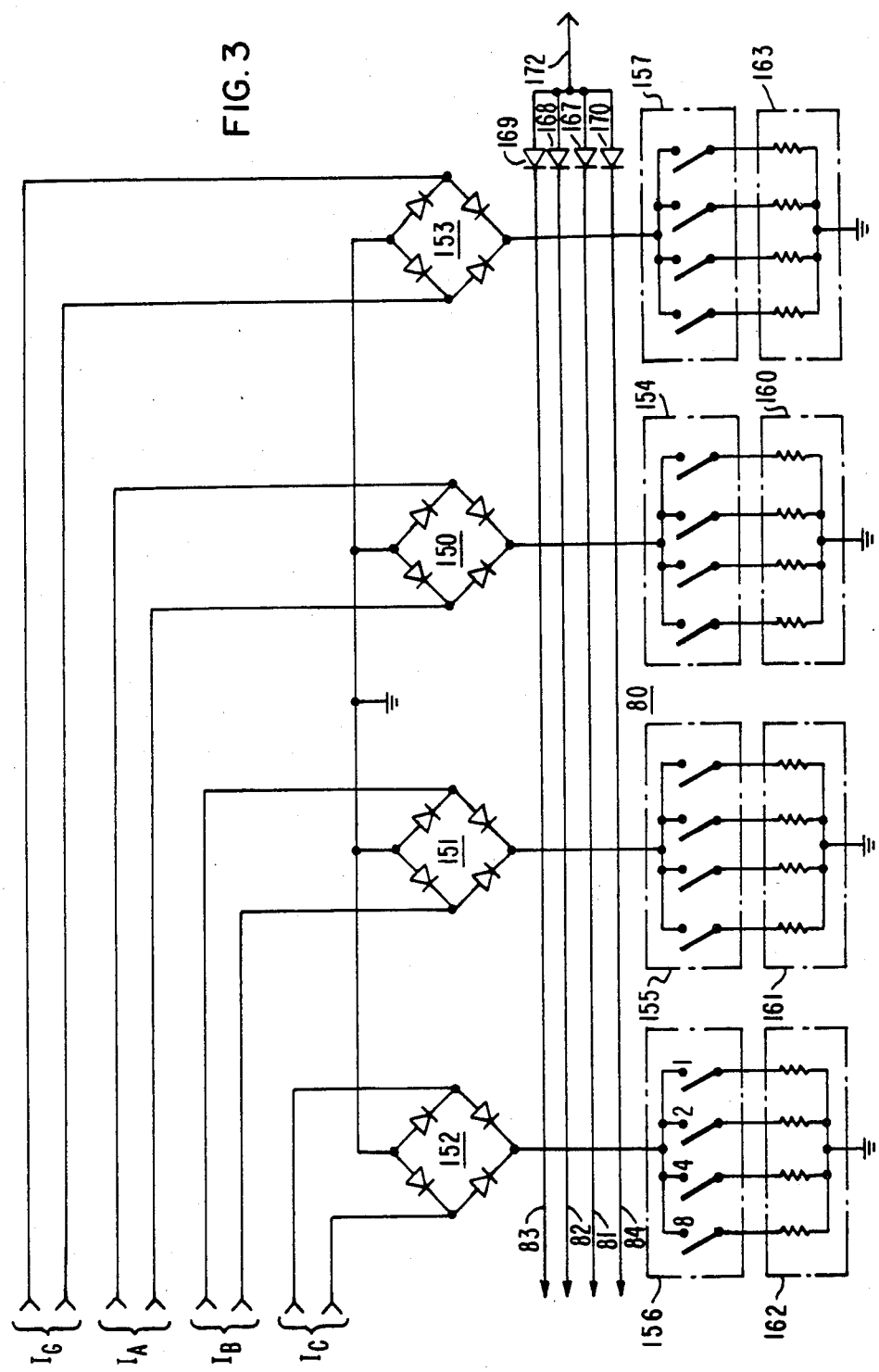
FIG. 3 is a schematic diagram of a rectification and range selection unit suitable for use in the embodiment of FIGS. 2A and 2B.

Referring to FIG. 3, the rectification and range selection unit 80 comprises a rectification circuit for each of the current measurement signals $I_A$, $I_B$, $I_C$, and $I_G$. In the present embodiment the rectification circuits are diode bridges 150 through 153, respectively. One port of each diode bridge 150 through 153 is coupled to a common potential, like-ground, for example. The opposite ports adjacent to the common port are each coupled to their respective current measurement signals and the port opposite the common port of the diode bridges 150 through 153 is coupled to the rectified current signal line 81 through 84, respectively. Each of the lines 81 through 84 has coupled to it a current range selector switch network 154 through 157, respectively, and each network 154 through 157 has a resistor network 160 through 163, respectively, coupled thereto. In the present embodiment each selector switch network 154 through 157 includes four switches with each switcd thereof coupled to ground potential through a resistor from its respective resistor network. The four resistors of each resistor network 160 through 163 may have resistance values in a ratio of 1, 2, 4 and 8 with respect to each other. Thus, the opening and closing of the select switches of each network 154-157 may alter the impedance of the respective resistor networks in a four-bit binary fashion. Accordingly, the setting of the impedance networks by the switch selection process alters the range of the rectified current measurement signals over their respective lines 81 through 84. The rectified signal lines 81 through 84 are further coupled through individual respective diodes 167 through 170 cathode-to-anode to a common signal line 172. The signal line 172 is coupled to the override circuit 88 as shown in the block diagram schematic of FIG. 2.

In operation, the current measurement signals are rectified by their respective diode bridges 150 through 153 and produce a rectified signal of negative potential over their respective signal lines 81 through 84. The range of the negative potential rectified signals are scaled in accordance with the setting of the current range selector switch networks 154 through 157. Moreover, the largest magnitude of the negative rectified signals of the lines 81 through 84 is provided to the signal line 172 through the diode auctioneering of the diodes 167 through 170. This largest magnitude signal is used in conjunction with the override circuit 88 which will be described in connection with the circuit diagram embodiment of FIG. 4.

Figure 4:
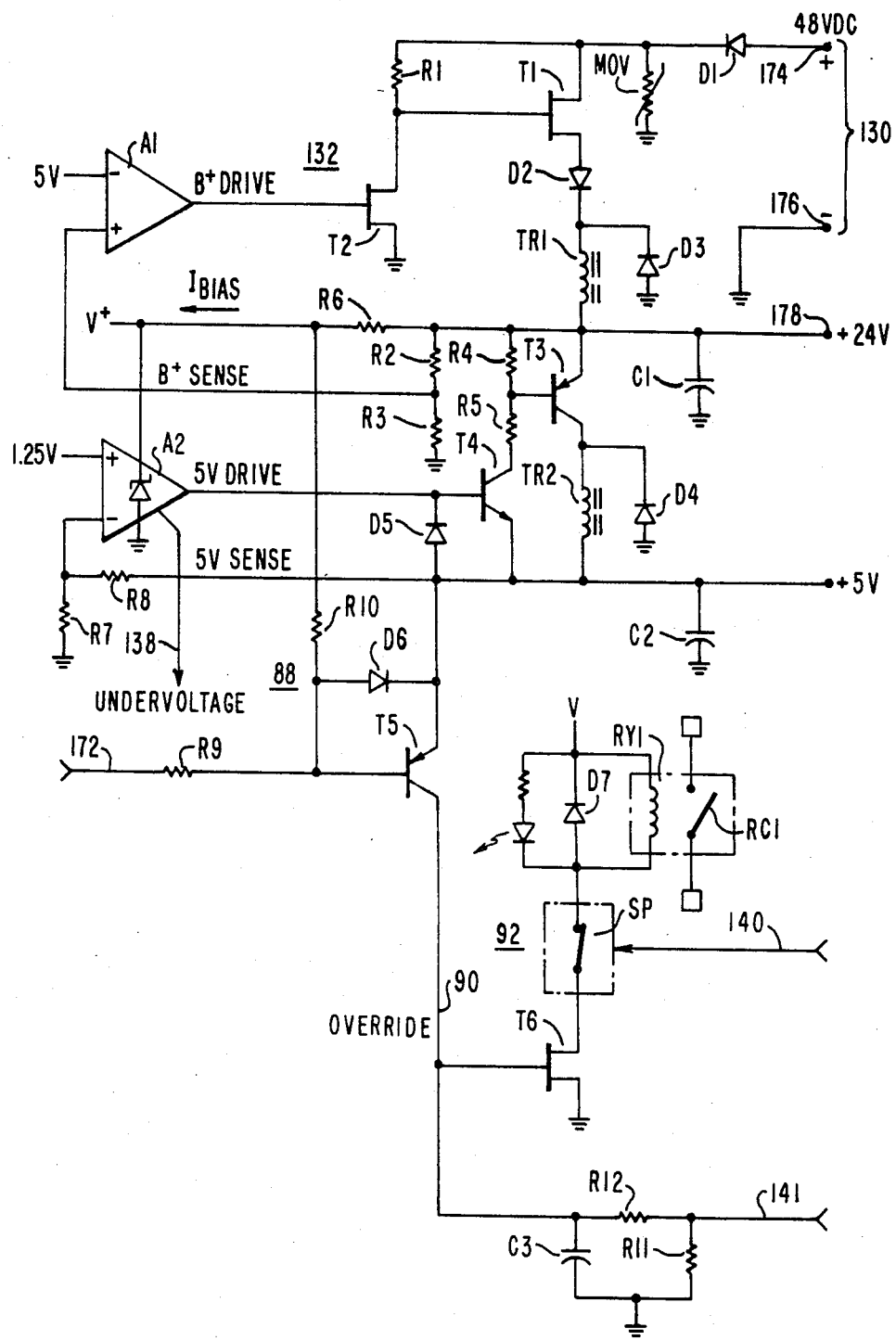
FIG. 4 is a circuit schematic of a power supply regulator and override circuit suitable for use in the embodiment of FIGS. 2A and 2B.

Referring to FIG. 4, the voltage of the station battery 130, which may be on the order of 48 VDC may be provided to the power supply 132 across the terminals 174 and 176. The positive potential appearing at 174 is coupled to the anode of a diode D1 and the negative potential at 176 is coupled to ground or common potential. The cathode of diode D1 may be coupled to ground through a conventional MOV and may also be coupled to one channel side of a field effect transistor T1 and one end of a resistor R1. The other end of the resistor R1 is coupled to the base of the transistor T1 and one side of the channel of another field effect transistor T2. The other channel side of T1 is coupled through a forward bias diode D2 and a reverse bias diode D3 to ground potential. The common cathode connections of D2 and D3 are coupled to a transformer TR1. The other channel side of T2 may be coupled to a common potential with its base being driven by an amplifier A1. The other side of the transformer TR1 is filtered by a capacitor C1 and becomes the 24 VDC source at port 178. The 24 VDC source line is coupled to a common potential through the resistor network comprising resistors R2 and R3. The connection point of R2 and R3 is coupled to a non-inverting input (+) of amplifier A1 which has its inverting (−) input coupled to a reference voltage, like 5 V, for example.

The foregoing described circuitry represents a chopper driven regulator circuit in which the transistors T1 and T2 are operated to chop the signal provided to transformer TR1 which in turn provides the source of 24 V at the port 178. The resistor divider network R2 and R3 provide a potential to the amplifier A1 as a feedback signal to establish that the 24 V potential is maintained. The feedback signal of R2 and R3 is compared with the reference signal 5 V and the difference therebetween determines the drive signal of A1 for the transistors T1 and T2. For example, if the voltage at point 178 falls slightly below 24 V the amplifier A1 drives the transistors T1 and T2 to provide a signal through transformer TR1 and conversely, when the potential at 178 becomes slightly above 24 V, the amplifier drive is eliminated to reduce the potential at 178. The flyback diode D3 clamps the potential at the other end of TR1 by absorbing the energy stored therein at times when the drive signal is eliminated.

The regulated 24 V source is also provided to the emitter of a PNP transistor T3 which has its collector coupled to another transformer TR2 and coupled to ground through another flyback diode D4. The other end of the transformer TR2 is the regulated source potential 5 V which is filtered by a capacitor C2 coupled to common potential. The source line of the 24 V may also be coupled to the collector of a NPN transistor T4 through a resistor network of resistors R4 and R5. The base of the transistor T3 is coupled to the connection of resistors R4 and R5. The emitter of transistor T4 is coupled to the source line of the regulated 5 V potential and a diode D5 may be coupled cathode to anode across the base and emitter junctions of the transistor T4. The base of transistor T4 may be driven by another amplifier A2 which is supplied with a current bias signal from the 24 V source line through a resistor R6. Internally the amplifier A2 may function as a zener diode creating a voltage potential V+ thereacross from the current bias provided thereto. A non-inverting (+) input of A2 may be coupled to a reference potential which may be on the order of 1.25 V for the present embodiment. The regulated 5 V signal may be coupled through the series resistor network R7 and R8 to ground potential and the connection between R7 and R8 is provided to the non-inverting (−) input of A2 as a feedback sense signal with regard to the potential of the regulated 5 V source. The resistors R7 and R8 may have values with a ratio of one to three for the present embodiment. In addition, the amplifier A2 is operative to sense an undervoltage condition and generate a signal 138 indicative thereof which is supplied to the auto restart circuit 134 as described in connection with the block diagram schematic embodiment of FIG. 2.

The foregoing described portion of the circuitry of the power supply unit 132 provides a regulation of the 5 V source. In operation, the potential level of the 5 V source is sensed by the (−) input of the amplifier A2 wherein it is compared with the reference potential of the (+) input. The drive signal for the transistors T3 and T4 is provided by the amplifier A2 based on the difference between the potentials of its (−) and (+) inputs. In this manner, a chopped signal is provided to the transformer TR2 to maintain the 5 V source at its proper potential level. The flyback diode D4 handles the reserve energy of the transformer TR2 when the signal supplied thereto from transistor T3 is switched off.

The remaining circuitry of FIG. 4 depicts a suitable embodiment for the override circuit 88 and a portion of the trip control circuit 92. The circuit 88 includes a PNP transistor T5 having its emitter coupled to the 5 V source and its base coupled to the signal 172 through a resistor R9. The base of T5 is also coupled to the 24 V source through a resistor R10 and the resistor R6. A diode D6 may be coupled across the emitter-base junction of T5 cathode to anode, respectively. The collector of T5 provides the override signal 90 to the trip control circuit 92. In operation, the override circuit 88 responds to a large negative potential signal over the signal line 172 to activate the transistor T5 which provides a override signal over the signal line 90 to the circuit 92.

The trip control circuit 92 includes a relay coil RY1 which operates a relay contact RC1 which provides a trip indication to external units such as the display panel and the circuit which governs the breaker mechanism 38. The relay coil RY1 is driven by a field effect transistor T6 which is activated by the override signal 90 or the trip governing signal 141 provided thereto from the microcomputer system 70. Between relay coil RY1 and transistor T6 may be coupled a switch prohibit function SP which is responsive to the reset signal 140 to inhibit a trip governing operation. A resistor R11 may be coupled to ground from the signal line 141 and a resistor R12 may couple the signal line 141 to the base of the transistor T6. A capacitor C3 provides some filtering to the signal lines 141 and 90 which are coupled together at the base of T6 in an OR connection. The relay RY1 may have a diode D7 coupled thereacross and in addition may have a resistor and light emitting diode coupled in series to the transistor T6 as an indication of energization of the relay RY1.

Figure 5:
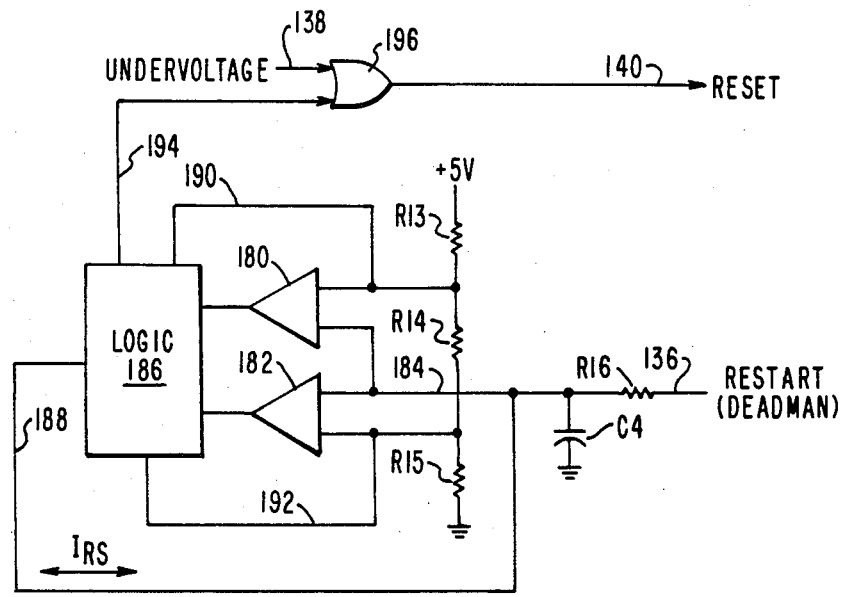
FIG. 5 is a block diagram schematic of a suitable auto restart circuit.

A suitable embodiment for the auto restart circuit 134 is shown in the functional block diagram schematic of FIG. 5. Referring to FIG. 5, two reference potentials are formed by the resistor divider network of the series connection of resistors R13, R14 and R15 coupled between the 5 V source and common potentials. The reference potential at the connecting point of R13 and R14 is provided to one input of a comparator circuit 180 and the reference potential formed at the connection point between the resistors R14 and R15 is provided to one input of another comparator circuit 182. The restart or deadman signal 136 is converted to a current by the resistor R16 and the converted current signal is used to charge a capacitor C4. The potential across capacitor C4 is provided to the other inputs of the comparator circuits 180 and 182 over the signal line 184. The comparator units 180 and 182 are provided to logic circuitry 186 which responds to the states of the outputs thereof. From the logic circuit 186 bidirectional current may be provided over the signal line 188 to the capacitor C4. In addition, feedback signal lines 190 and 192 are coupled between the first and second reference potential points, respectively, to the logic circuit 186. A signal line 194 is capable of carrying a reset governing signal to one input of an OR gate function 196. The other input of the OR gate 196 may be coupled to the undervoltage signal 138. The generation of either the undervoltage signal or reset governing signal causes the OR gate 196 to generate the reset signal 140 to the microcomputer system 70.

In operation, should the duty cycle of the signal 136 generated by the microcomputer system 70 cause the potential across the capacitor C4 to depart beyond the window potentials of the first and second reference voltages, the outputs of one of the comparators will be caused to change state. For example, when comparator 180 changes state, the logic unit 186 sinks current from the signal lines 188 and 190 which in turn decreases the first reference voltage to a new reference level and concurrently causes the voltage across the capacitor C4 to diminish at a rate commensurate with the current sink of signal line 188. During this time, the reset governing signal 194 causes the OR gate 196 to effect the reset signal 140 which in turn resets the program execution of the microcomputer system 70 to a predetermined state in a conventional manner. When the voltage across the capacitor C4 is diminished below the new reference potential, the comparator 180 reverts back to its original state terminating the current sink over signal lines 188 and 190. Concurrently therwith, the reset signal 140 is relieved allowing the program execution of the system 70 to continue.

Similarly, when the potential across the capacitor C4 falls below the second reference potential, the comparator 182 changes state causing the logic unit 186 to source current to signal lines 188 and 192. The source current over signal line 192 increases the second reference potential to a new reference level greater than the original second reference level. In addition, the current source of 188 causes the voltage potential across capacitor C4 to increase at a rate commensurate with the source current supplied thereto. Accordingly, during this time the reset governing signal 194 is generated to effect the reset signal 140. As the voltage across C4 increases beyond the new reference potential of the comparator 182, the comparator 182 reverts to its original state at which time the logic circuit 186 ceases to source current over signal lines 188 and 192. Consistent with this condition, the second reference potential returns to its original potential level and the reset governing signal 194 is terminated. A more detailed description of a suitable supervisory or auto restart circuit 134 may be found in the copending U.S. Patent Application Ser. No. 725,050 which is incorporated by reference herein for this purpose.

Figure 6:
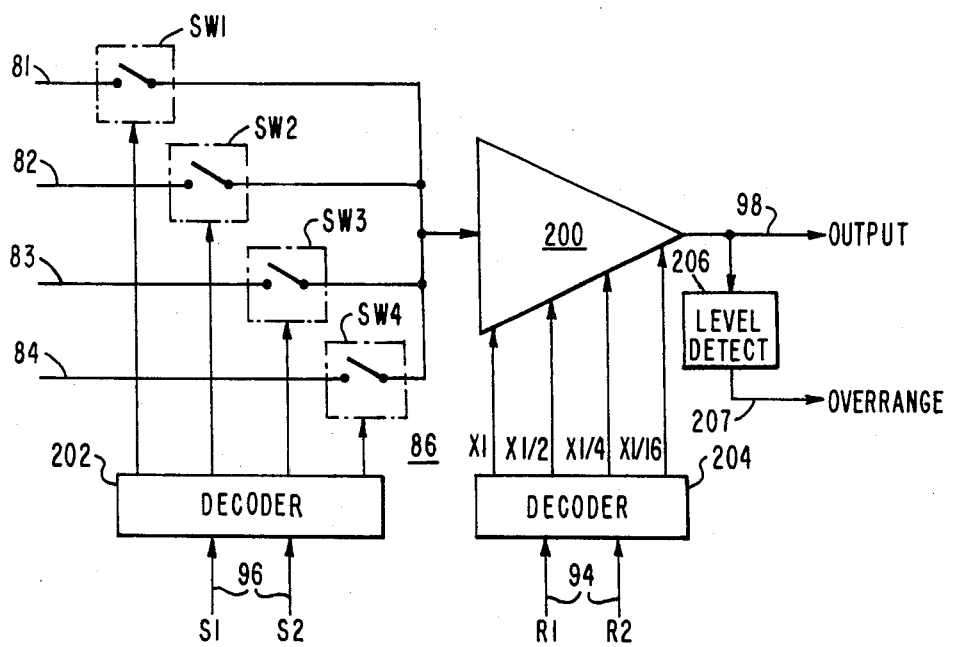
FIG. 6 is a functional block diagram schematic depicting a suitable embodiment for an analog signal multiplexer and prescaler unit.

A suitable embodiment for the analog signal multiplexer and prescaler 86 is shown functionally in the diagram of FIG. 6. Referring to FIG. 6, the rectified and prearranged signals 81 through 84 are coupled to one input of the analog gates SW1 through SW4, respectively. The output of the gates SW1 through SW4 are commonly coupled together and provided to a ranging circuit 200. The switches are controlled by a decoder circuit 202 in accordance with the coded signals S1 and S2 of the selection signals 96. The proper code over signal lines S1 and S2 causes one of the analog switches SW1 through SW4 to close permitting the associated current measurement signal to pass to the ranging circuit 200. The operation of the circuit 200 is controlled by the decoder circuit 204 which is governed by the digital code over signal lines R1 and R2 from the range select signals 94. In the present embodiments the possible ranges of the circuit 200 include 1, ½, ¼, and 1/16. Appropriate signals for effecting the desired range are provided to the ranging circuit 200 from the decoder 204 in response to the digital code of R1 and R2. The purpose of the ranging circuit 200 is to keep the amplitude of the ranged signal over signal line 98 to within the input range of the A/D converter 100. The signal range may be detected by the level detector circuit 206 which provides an overrange signal 207 to the I/O 76 of the microcomputer system 70. The operation of the analog multiplexer and prescaler 86 will be more fully understood from the description hereinbelow of the program execution of the microcomputer system 70. A more detailed description of a suitable analog multiplexer and prescaler 86 may be found in the copending U.S. Pat. No. 4,626,821 which is incorporated by reference herein for this purpose.

THEORY OF OPERATION

The derivation of a time-to-trip upon detection of an overcurrent condition, performed by the programmed microcomputer system 70 is based on the following equation:

$$T = \left[ T_0 + \frac{K_1}{(I - I_0)^P} \right] \cdot G, \quad (1)$$

where
I is a selected measurement current signal in amperes, P.U., RMS,
$I_O$ is the overcurrent level in amperes, P.U., RMS,
$K_1$, G, and P are derivation constants, and
To is a fixed time delay in seconds, P.U. Equation (1) may be rewritten as:

$$(I - I_0)^P \left( \frac{T}{G} - T_0 \right) = K_1. \quad (2)$$

It is understood that when dealing with digital signal processing systems, calculations are performed only at discrete times separated by some predetermined system time base $\Delta t$. For the present embodiment, this time base may be the period of one cycle of the power system frequency, i.e. for a 60 Hz system, $\Delta t = 16.667$ ms; and for a 50 Hz system, $\Delta t = 20$ ms. In addition, the times T and To may be represented as a function of these time bases:

$$T = N\Delta t, \text{ and} \quad (3)$$

$$T_0 = L\Delta t, \quad (4)$$

where N and L are integers and may be represented as:

$$N = T/\Delta t, \text{ and} \quad (5)$$

$$L = T_0/\Delta t. \quad (6)$$

Thus, a substitution of equations (3) and (4) into equation (2) results in the following:

$$(I - I_0)^P \left( \frac{N\Delta t}{G} - L\Delta t \right) = K_1, \quad (7)$$

and by factoring equation (7), the following equation results:

$$(I - I_0)^P (N - GL) = \frac{K_1 G}{\Delta t}. \quad (8)$$

Moreover, equation (8) may be rewritten in the form:

$$\sum_{m=1}^{N-GL} (I_m - I_0)^P = \frac{K_1 G}{\Delta t}, \quad (9)$$

where $$I_m = \sqrt{\frac{1}{8} \sum_{j=1}^{8} I_j^2} \quad (10)$$

for each period or cycle m of the power system frequency. Note that for the present embodiment, 8 current measurement signal samples $I_j$ were felt sufficient to compute the RMS value $I_m$ for each current phase or ground cycle m over the interval N-GL. In addition, it was decided, for the present embodiment, not to divide the sum of squared samples $I_j^2$ by ⅛, therefore, in order to eliminate this step, equation (9) was transformed into:

$$\sum_{m=1}^{N-GL} (I_m' - \sqrt{8} I_0)^P = \frac{K_1 G \sqrt{8}}{\Delta t}, \quad (11)$$

where $$I_{m'} = \sqrt{\sum_{j=1}^{8} I_j^2} . \qquad (12)$$

Now, equation (11) may be transformed into values which correspond to the digitally coded signals of the digital signal processor 70. In the present embodiment, a per unit (P.U.) of current measurement signal is equated to 102 in binary or digital code (i.e. 66 hexidecimal). As a result, equation (11) is converted by the following technique:

$$(102)^p \sum_{m=1}^{N-GL} (I_{m'} - \sqrt{8} I_0)^p = (102)^p \cdot \frac{K_1 \cdot G \cdot \sqrt{8}}{\Delta t}, \qquad (13)$$

but since the current measurement signals are sampled and digitized at times j and $I_O$ may be stored digitally, the term $(102)^p$ in the left-hand side of equation (13) may be factored as follows:

$$\sum_{m=1}^{N-GL} (I_{md} - \sqrt{8} I_{od})^p = (102)^p \frac{K_1 G \cdot \sqrt{8}}{\Delta t}, \qquad (14)$$

where $$I_{md} = (102)^p I_{m'}, \qquad (15)$$

and $$I_{od} = (102)^p I_0. \qquad (16)$$

Also, for the precent embodiment, the time dial readings TD may be an 8-bit digital word accessed from the converter 100 to the processor 70. It has been determined that $$\tfrac{1}{2} \leq TD \leq 11 \ (P.U.), \qquad (17)$$

and $$G = \frac{TD}{4}, \qquad (18)$$

so that $$0.125 \leq G \leq 2.75 \ (P.U.). \qquad (19)$$

A P.U. of G setting has been determined to be 93 as a binary or digitally coded signal. Therefore, equation (14) may be scaled for the digital G per unit scaling factor as follows:

$$\sum_{m=1}^{N-GL/93} (I_{md} - \sqrt{8} I_{od})^p = (102)^p \frac{K_1 \cdot G \cdot \sqrt{8}}{93 \cdot \Delta t}. \qquad (20)$$

If $$L' = L/93, \qquad (21)$$

and $$K_1' = \frac{(102)^p}{93} \cdot \frac{K_1 \sqrt{8}}{\Delta t}, \qquad (22)$$

then equation (20) becomes:

$$\sum_{m=1}^{N-GL'} (I_{md} - \sqrt{8} I_{od})^p \geq K_1'G, \qquad (23)$$

keeping in mind that L' and $K_1'$ will have different values for 50 Hz and 60 Hz power systems, because the value of $\Delta t$ becomes 20 ms and 16.667 ms, respectively. Moreover, $K_1'$, L', $\sqrt{8} I_{od}$ and P are all derivation constants which are based on the type of overcurrent protection desired.

Equation (23) represents a programmable relationship for the signal processor 70 such that the quantity $(I_{md}-\sqrt{8} I_{od})^p$ derived for each sample m may be accumulated in a summing register until the resulting sum thereof becomes equal to or greater than $K_1'G$ at which time the relationship has accumulated N−GL' time units $\Delta t$. The time-to-trip is reached when N time units $\Delta t$ is reached. Thus, once equation (23) is satisfied, an additional GL' time unit must be accumulated before the trip governing signal may be set. Graphically, GL' represents a time asymptote for the selected time overcurrent curve which means that no matter what the value of overcurrent measured, so long as it is greater than the overcurrent "pick up" value associated with equation (23) and less than any instantaneous setpoint, the minimum time-to-trip is GL' time units. A better understanding of the programmed operation of the above relationship will result from the description of the program flow charts of FIGS. 19 and 20.

The aforementioned derivation constants along with the value of G, which is based on the time dial setting (TD) by the relationship of equation (18), together characterize a family of time-overcurrent curves for a desired overcurrent protection style number from a plurality of style numbers which are generally well-known to the utility arena, commonly referred to as "CO styles".

Figure 7:
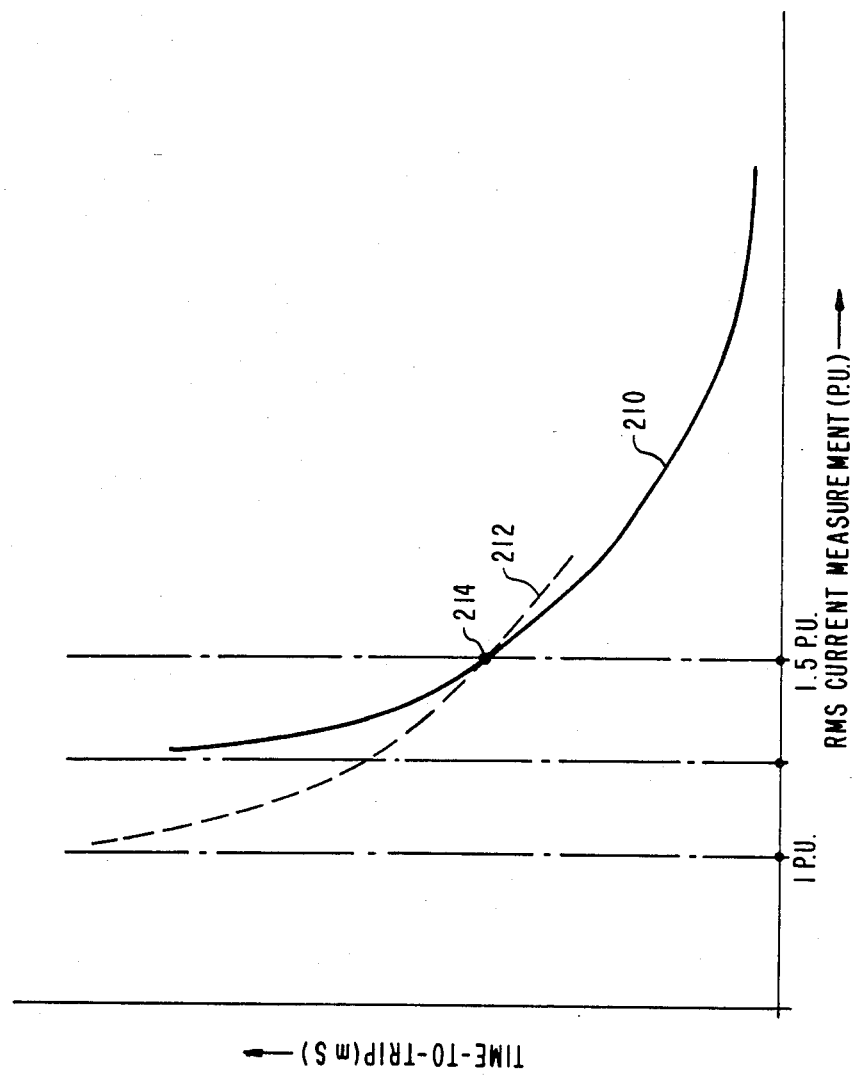
FIG. 7 is a graph illustrating two curves, each representing a different family of time-overcurrent curves, from which to derive an overcurrent time-to-trip based on corresponding current measurement values.
Figure 8:
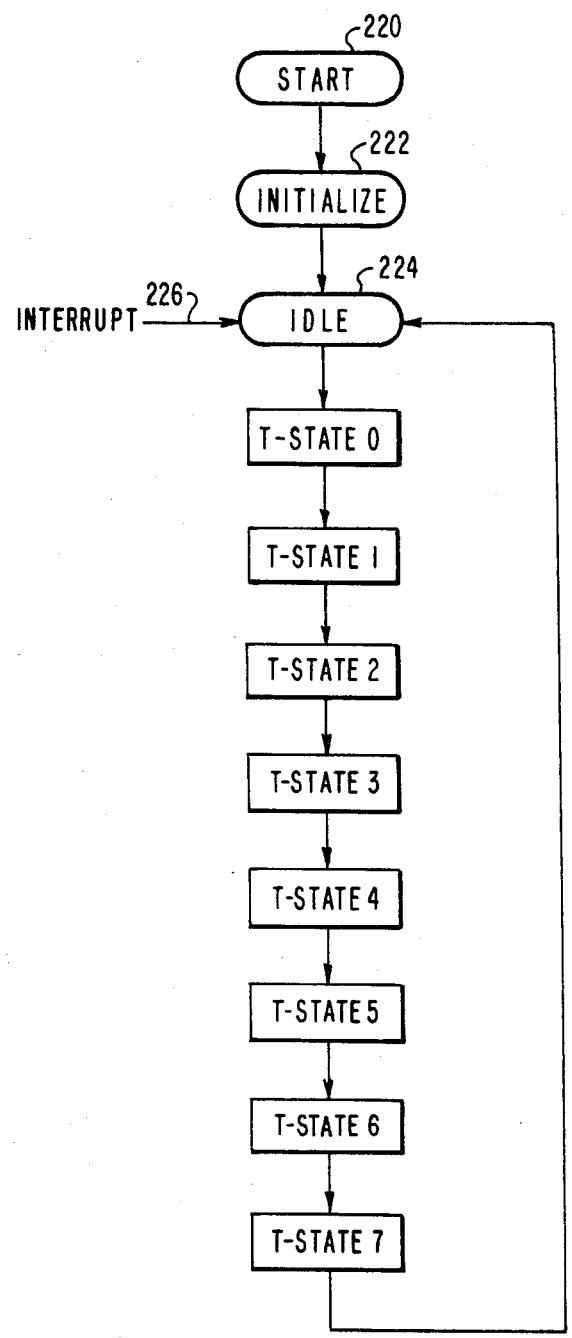
FIG. 8 is a flow diagram illustrating an execution sequence of flow states suitable for operating the programmed processor of the embodiment described in connection with FIGS. 2A and 2B.

The above characterization of equation (23), while an accurate representation of a family of time-overcurrent curves, may not produce curves which are asymptotic to the 1 P.U. RMS current measurement asymptote as shown by the illustrative graph of FIG. 7 (see curve 210). To resolve this situation, an alternate equation to characterize a new curve (see curve 212 in FIG. 7), which is asymptotic to the 1 P.U. RMS current measurement and intersects with the characterized curve 210 at the RMS current measurement 1.5 P.U. shown at 214, is proposed for when the RMS current measurement signal is between 1.0 and 1.5 P.U., i.e. 1 P.U.$<I \leq 1.5$ P.U. An alternate relationship found suitable for characterizing this second curve 212 is:

$$\sum_{m=1}^{N} (I_m - 1 \ P.U.) \geq \frac{K_2 G}{\Delta t}, \qquad (24)$$

where $K_2$ may be formed by substituting:

$$I_{md} = 1.5 \cdot \sqrt{8} \cdot 102 = 433 \qquad (25)$$

into equation (23) to compute $N@I_m=1.5$ P.U. as follows:

$$N = G\left(\frac{K_1'}{(433 - \sqrt{8}\ I_{od})^p} + \right)L', \quad (26)$$

and into equation (24) to compute $N@I_m = 1.5$ P.U. as follows:

$$N = \frac{GK_2'}{(433 - 288)^p} = \frac{GK_2'}{(145)^p} \quad (27)$$

By equating computed N's of eq's (26) and (27), the following equation results:

$$K_2' = \left\{\frac{K_1'}{(433 - \sqrt{8}\ I_{od})^p} + L'\right\}(145)^p. \quad (28)$$

It is understood that there will be different values of $K_2$'s for the 50 Hz and 60 Hz power systems.

Typical values of $I_O$ (P.U.), $T_O$ (ms) and $K_1$ for various well-known overcurrent protection style numbers are shown in Table 1 below:

TABLE 1

| PARAMETER | CO STYLE | | | | | | |
|---|---|---|---|---|---|---|---|
| | 2 | 5 | 6 | 7 | 8 | 9 | 11 |
| $I_0$ (P.U.) | 675 | 1.13 | 1.19 | 0.80 | 1.27 | 1.35 | 0.5 |
| $T_0$ (ms) | 111.99 | 8196.67 | 784.52 | 524.52 | 477.84 | 310.01 | 110.00 |
| $K_1$ | 735 | 13768.94 | 671.01 | 3120.56 | 4122.08 | 2756.06 | 17640 |

From the values of Table 1 and the equations provided hereabove derivation constants may be computed for $K_1'$, $L'$, $\sqrt{8}\ I_{od}$, and $K_2'$ and represented as digitally coded words for storage in the memory 74 of the signal processor 100. An exemplary look-up table for the memory 74 is displayed in Table 2 below:

TABLE 2

| PARAMETER | CO STYLE | | | | | | |
|---|---|---|---|---|---|---|---|
| | 2 | 5 | 6 | 7 | 8 | 9 | 11 |
| $K_1'$ (60 Hz) | 137 | 2562 | 124 | 580 | 767 | 513 | 947284 |
| $K_1'$ (50 Hz) | 114 | 2135 | 104 | 484 | 640 | 427 | 789351 |
| $L'$ (60 Hz) | 0.0723 | 5.28 | 0.506 | 0.339 | 0.308 | 0.200 | 0.0710 |
| $L'$ (50 Hz) | 0.0602 | 4.41 | 0.422 | 0.282 | 0.257 | 0.167 | 0.0590 |
| $K_2'$ (60 Hz) | 94.0 | 4237 | 273 | 465 | 1705 | 1720 | 239956 |
| $K_2'$ (50 Hz) | 78.2 | 3533 | 229 | 388 | 1422 | 1431 | 199946 |
| $\sqrt{8}\ I_{od}$ | 195 | 326 | 343 | 231 | 366 | 389 | 144 |

The utilization of the look-up table based on the style number setting will be more fully understood with regard to the description in connection with the programmed operation of the overcurrent protection control apparatus herebelow.

PROGRAMMED OPERATION OF THE CONTROL APPARATUS

The description of the programmed operation of the overcurrent protection control apparatus described in connection with the embodiment of FIG. 2 will be described now using the illustrative flow charts of FIGS. 8 through 19. The execution sequence of the programmed microcomputer system 70 may operate in accordance with the flow states as shown in the flow diagram of FIG. 8. For example, upon receiving the reset command over signal line 140 from the auto restart circuit 134 the program execution begins at the starting point 220. When the reset signal is removed the program execution continues at the initialize section 222 wherein instructions are sequenced in a conventional manner to initialize the microcomputer system to a state to commence the programmed operations. Thereafter, the program execution remains idle at 224 until it receives an interrupt signal 226. The interrupt 226 may be generated from either an internal or an external source in a conventional manner.

The program architecture for the present embodiment is broken down into eight states wherein the program instructions of each state are executed based on the sequenced interrupt associated therewith. That is, state $-0$ will be executed upon interrupt 0, state $-1$ is executed upon interrupt 1, and so on down the line through state $-7$ wherein state $-0$ is repeated upon the next interrupt in succession.

Figure 9:
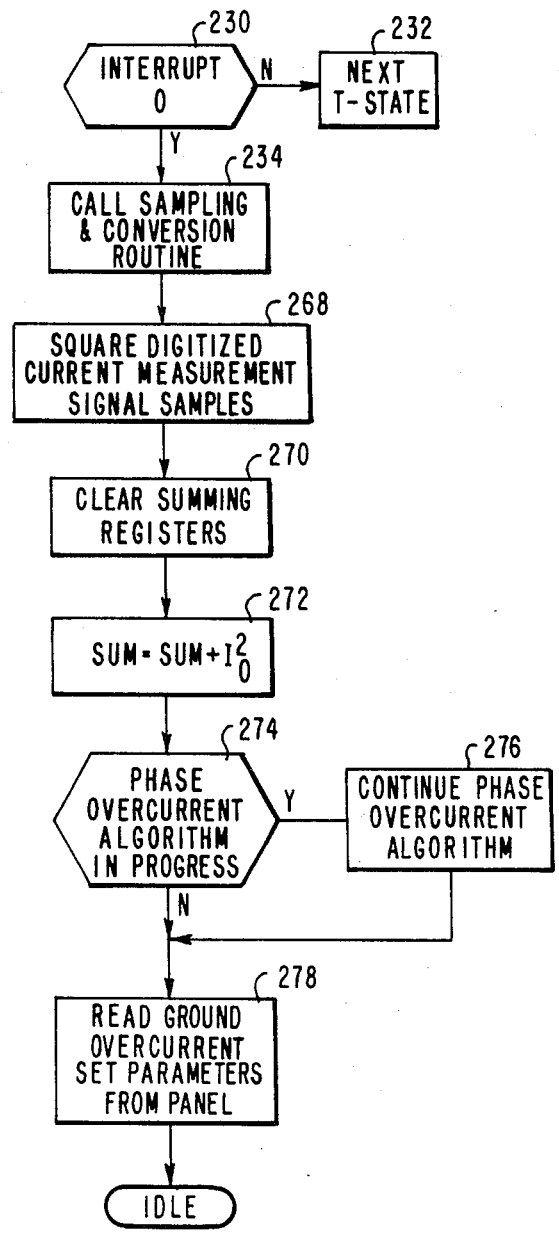
FIGS. 9 through 18 depict illustrative flow charts suitable for embodying the programmed operations of the various flow states as shown in the flow diagram of FIG. 8.

The programmed operation of state $-0$ will be described in connection with the illustrative flow chart of FIG. 9. The decisional block 230 determines if the present interrupt is the interrupt associated with state $-0$ in the sequence of interrupts. If not, at block 132, the program execution reverts to the instructions of the next succeeding state of instructions. With an affirmative decision, program execution continues at the block 234 wherein a sampling and conversion routine is called for execution. An exemplary program of a current measurement signal sampling and conversion routine is shown in the flow chart of FIG. 10. When called the program execution of the sampling and conversion routine starts at the block 236 wherein the proper digital code is set for the signals S1 and S2 of the selection lines 96 to select a first input of the analog multiplexer 86. Thereafter, in block 238 the gain of the ranging circuit of 86 is initialized to one by setting the proper code for the signals R1 and R2 of the range setting lines 94. In the next block 240 a ranging subroutine is called and executed.

Figure 10:
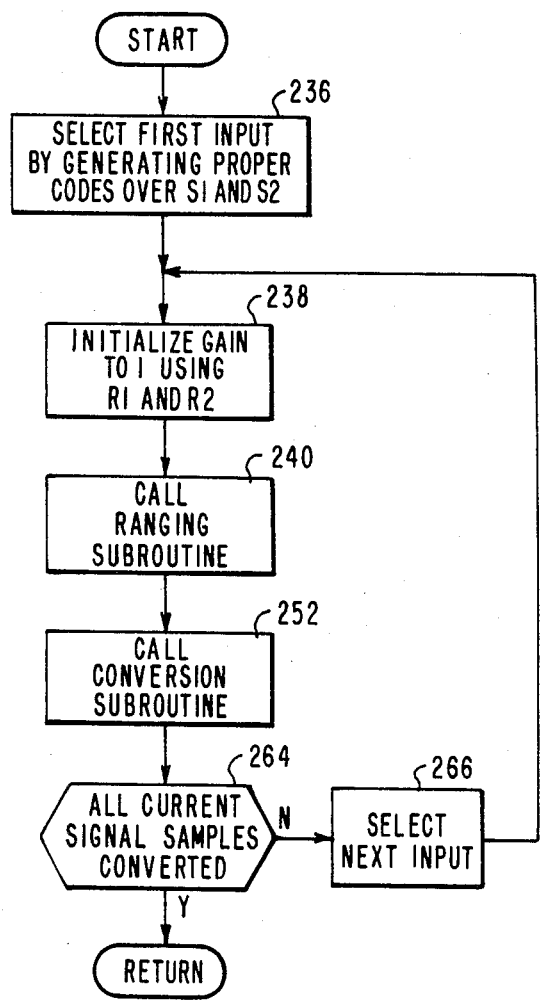
Figure 11:
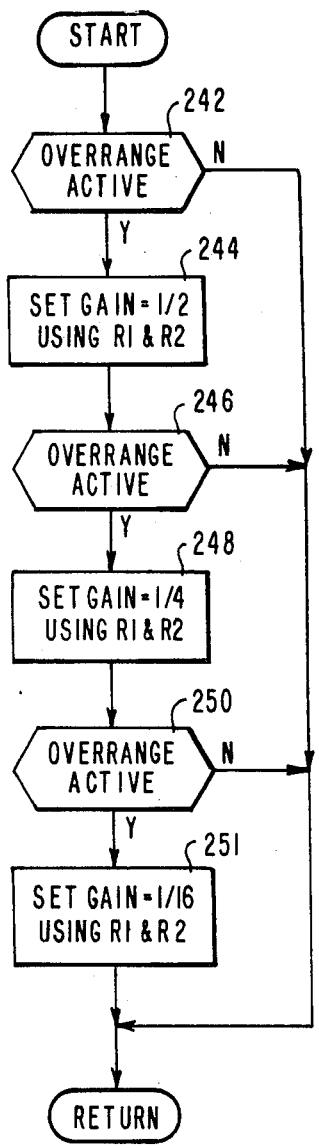
Figure 12:
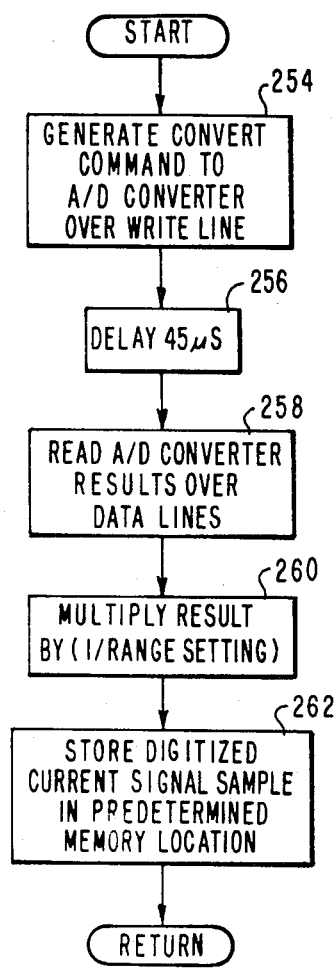

A suitable ranging subroutine is shown in the flow chart of FIG. 11. When called, the ranging subroutine starts at the decisional block 242 which determines whether the overrange signal 207 generated by the ranging circuit of 86 is active or not. A negative decision constitutes a proper range setting and the program execution returns to the sampling and conversion routine of FIG. 10. Otherwise, the program execution continues at block 244 wherein the range gain is set to ½ using the signal lines R1 and R2. The overrange signal 207 is once more sensed by the decisional block 246 and if not active the program execution returns to the routine of FIG. 10. If an overrange condition exists, the program execution of the ranging subroutine continues. The range gain of the ranging circuit of 86 is changed once again to ¼ in the block 248 the overrange signal 207 is checked in the decision block 250. Depending on the overrange activity the program execution either returns or the range gain is once more changed to 1/16 in the block 251 and thereafter returned.

Once the ranging subroutine of FIG. 11 is executed the program execution of the routine of FIG. 10 continues with the instructions of block 252 wherein a conversion subroutine is called. A suitable conversion subroutine is shown in the flow chart of FIG. 12 starting at block 254. In the block 254, the programmed operation generates a convert command to the A/D converter 100 over the write line 104 of the microcomputer system 70. In the successive block 256, the program execution is delayed for some predetermined time say 45 microseconds or thereabout, to permit the conversion to be performed in the converter 100. In 258, a read signal is issued over signal line 102 from the microcomputer system 70 to read the conversion digitized result over the data lines of the system bus PO by the microcomputer system 70. In the successive block 260, the digitized result read into the system 70 is multiplied by a value representing one divided by the range setting determined by the ranging subroutine of FIG. 11. The instructions of block 262 stores the resulting digital current signal sample in a predetermined memory location and then returns program execution to the sampling and conversion routine of FIG. 10.

Figure 19:
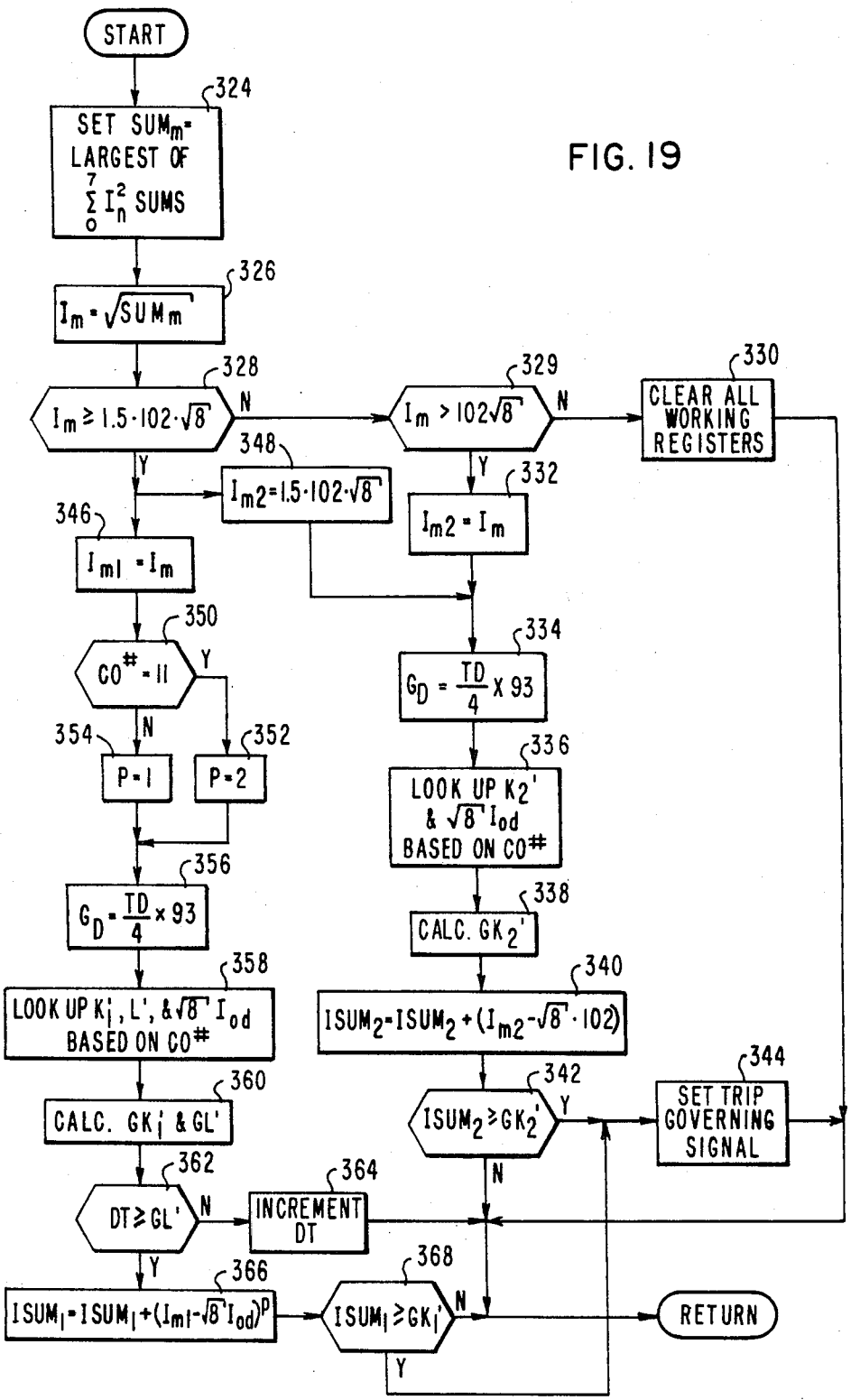
FIG. 19 depicts a program flow chart of an overcurrent algorithm suitable for operating the programmed processor of the embodiment shown in FIGS. 2A and 2B to derive an overcurrent time-to-trip.

After the conversion subroutine has been executed by block 252, the routine of FIG. 10 next determines if all of the current signal samples have been converted in the decisional block 264. If not, the next signal measurement input is selected by setting the proper codes of the signals S1 and S2 and repeating the execution of programming blocks 238, 240 and 252 until all of the current signal samples have been digitized and stored in their predetermined memory locations. Once this is accomplished, the program execution is returned to the next instruction block 268 in the execution of instructions of state −0 shown in FIG. 9. In 268, each of the digitized current measurement signal samples produced by the preceding block 234 are squared. In the next block 270 a summing register is designated for each of the current measurement signals and initially cleared, i.e. set equal to zero. Thereafter, the squared current measurement signal samples are added to the contents of their corresponding summing registers. In the decisional block 274, it is determined if a phase overcurrent algorithm which will be described hereinbelow in connection with the flow chart of FIG. 19 is in progress. It is, in the block 276, a portion of time is dedicated to continue the program execution thereof until completion. Program execution thereafter is continued at the block 278 wherein the ground overcurrent set parameters, like the ground instantaneous trip, the ground time dial, and the ground CO style select, for example, are read into the microcomputer system 70 from the panel 60. These set parameters are stored in appropriate memory locations for use in one or more of the other program execution states. Thereafter, the programmed operation is returned to the idle state to wait for the next interrupt signal.

Figure 13:
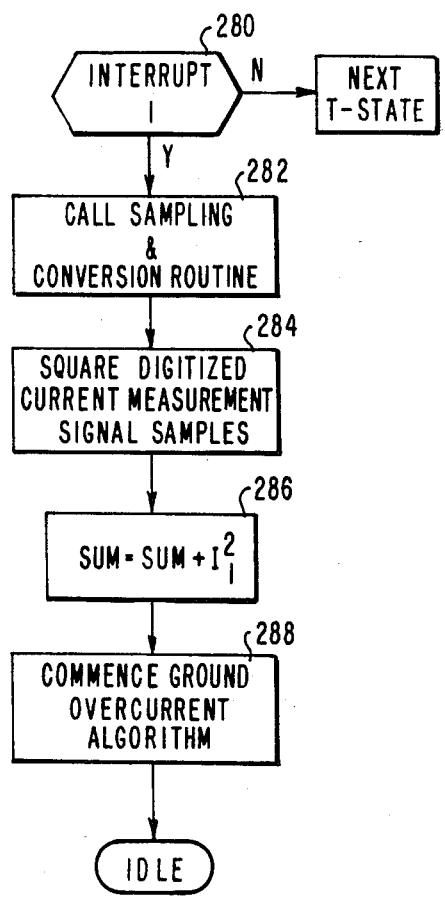
Figure 14:
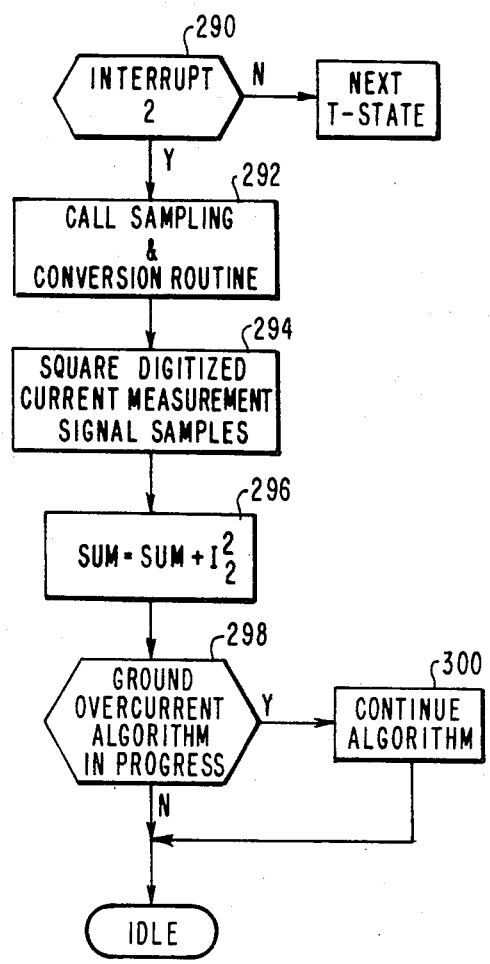
Figure 15:
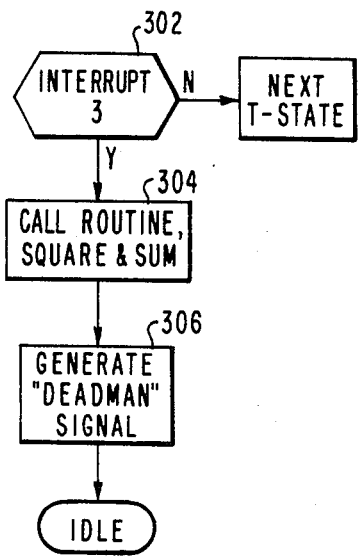
Figure 16:
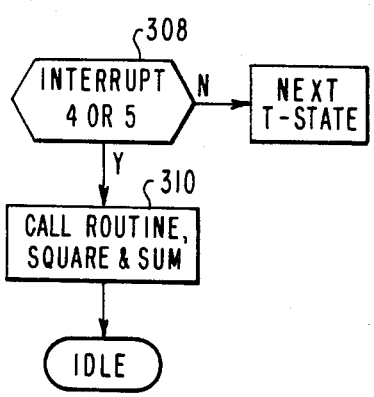
Figure 17:
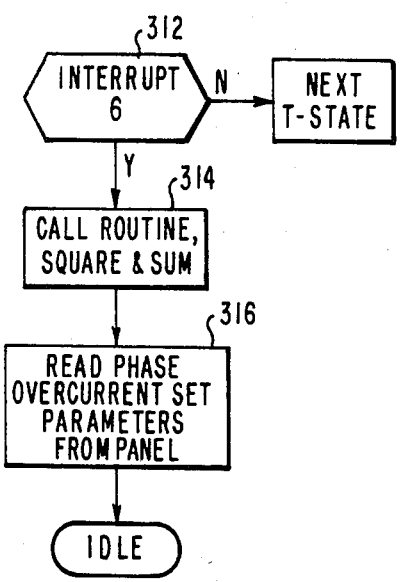

Referring to FIG. 13, the decision block 280 of state −1 determines if the present interrupt is the interrupt associated with the execution of state −1. If affirmative, the sampling and conversion routine is called and executed in block 282 and the resulting digitized current measurement signal samples are squared in the block 284. The squared signal samples are added to the contents of their corresponding summing registers in 286 and in the successive block 288 a ground overcurrent algorithm is commenced. A description of a suitable algorithm for this function is found hereinbelow in connection with FIG. 19. Thereafter, the program execution is returned to the idle state. Similar program operation occurs for state −2 having a decision block for the interrupt signal at 290 calling the conversion routine at 292, squaring at 294, and adding the squared signal samples to the contents of their corresponding summing registers in 296. In the decision block 298, it is determined if the ground overcurrent algorithm is still in progress and if so, time is provided to permit the continuation of the execution of that algorithm in block 300. Thereafter, program execution is returned to the idle state.

State −3 operation shown in FIG. 15 is again similar to the previous state operations wherein the decisional block 302 determines a proper interrupt and the block 304 conducts the conversion routine, the squaring and the summing of the contents of the summing registers. The additional block 306 causes the generation of the deadman or restart signal over signal line 136 to the auto restart circuit 134 and thereafter the program execution is returned to the idle state. Accordingly, both states −4 and −5 shown in FIG. 16 include a decisional block 308 for the determination of the proper interrupt signal and a instructional block 310 for calling the conversion routine, squaring and summing the squared results in the corresponding summing registers whereafter program execution is returned to the idle state. Similarly, state −6 shown in FIG. 17 includes the decision block 312 for determining the proper interrupt signal, the instructional block 314 for calling the conversion routine, squaring and summing as described hereabove. The additional instructional block 316 of state −6 causes the phase overcurrent set parameters like the phase instantaneous trip, the phase time dial, and the phase CO style select, for example, be read from the panel 60 utilizing the proper I/O and system bus signal lines. Again, the program execution is returned to the idle state once the parameters have been stored in their predetermined memory locations.

Figure 18:
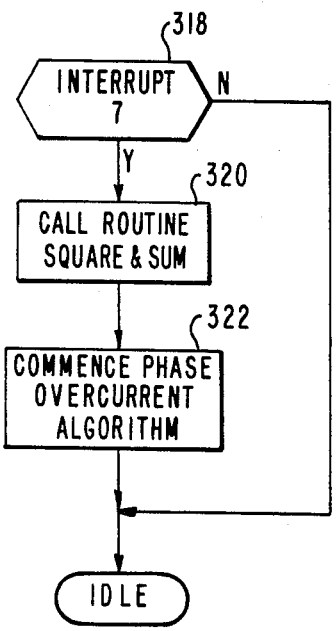

State −7 as shown in FIG. 18 operates similarly to the preceding states and includes the decisional block 318 for determining if the proper interrupt signal is present, the block 320 for calling the conversion routine, squaring the results and summing them into their appropriate summing registers. Thereafter in instructional block 322 the phase overcurrent algorithm is commenced. A suitable overcurrent algorithm consistent with the description of the theory of operation found hereabove is shown in the flow chart of FIG. 19. This algorithm may be used for both a ground or phase power line overcurrent condition in deriving time-to-trip.

Referring to FIG. 19, the overcurrent algorithm commences at the instructional block 324 wherein the largest quantity of the contents of the summing registers for the phase currents may be chosen as the phase current quantity to be used in the algorithm. This quantity is denoted as $SUM_m$ and the square root of this quantity is computed in the instruction block 326 with the resulting value being representative of the current root mean square (RMS) and denoted as $I_m$. The function of block 324 may be eliminated for the ground power line overcurrent case wherein the $SUM_m$ is equated to the summation register contents of the ground current measurement samples. In the following decisional blocks 328 and 329 the quantity $I_m$ is compared to 1.5 P.U. and 1.0 P.U. If $I_m$ is less than 1.0 P.U., all working registers, which will be defined below, are cleared in block 330 and the program execution is returned to the program operational state which initiated the overcurrent algorithm.

If $I_m$ is less than 1.5 P.U. and greater than 1.0 P.U. program execution continues at block 332 wherein a variable $I_{m2}$ is equated to the current value of $I_m$. In the next block 334, the time dial reading (TD) is divided by four and converted into its per unit digital value. In the next instructional block 336, the values of $K_2'$ and $\sqrt{8} I_{od}$ are read from the look-up table (see Table 2) based on the overcurrent style setting (CO#) read from the panel in a preceding operational state. Next, the quantity $GK_2'$ is calculated in block 338. In blocks 340 and 342, the time-to-trip is derived in accordance with a relationship which is consistent with that described in connection with equation (24) shown hereabove. More specifically, in block 340, a summing or working register ISUM$_2$ accumulates the values $(I_{m2} - \sqrt{8} \cdot 102)$ derived for each time sample m and decisional block 342 compares the accumulated result to $GK_2'$ calculated in block 338. When the relationship of block 342 is satisfied, the trip governing signal is set in block 344; otherwise, the program execution is returned to the routine that called the subroutine. It should be kept in mind that the values of $K_2'$ and $\Delta t$ are dependent on whether operating in a 50 Hz or 60 Hz power system network.

When $I_m$ is determined to be greater than 1.5 P.U. by decisional block 328, the program execution continues at the instructional block 346 wherein a $I_{m1}$ is equated to the current value of $I_m$ and $I_{m2}$ is equated to the equivalent of 1.5 P.U. Thereafter, program execution may continue concurrently at blocks 334 and 350 wherein it is determined if the overcurrent protection style number (CO#) read from the panel in a preceding operational state is 11; if so, the value of P is set to 2 in block 352. If not, the value of P is set to 1 in block 354; in either case, the program execution is continued at block 356 wherein the derivation parameter G is derived by dividing the time dial setting (TD), read and stored in a previous operational state, by four and converting the result into the proper per unit digital code.

In the next block 358, the derivation constants $K_1'$, $L'$ and $\sqrt{8} I_{od}$ are read from the look-up table (see Table 2) based on the style number (CO#) read from the panel in a preceding operational state. Next the values of $GK_1'$ and $GL'$ are computed in the block 360. Thereafter, in blocks 362 and 364, the fixed time $GL'$ is delayed using a delay timer DT, which is another working register. Once $GL'$ time units $\Delta t$ are accumulated, blocks 366 and 368 are executed to derive the time-to-trip in accordance with a relationship which is consistent with the equation described hereabove at (23). More specifically, in block 366, a summing or working register ISUM$_1$ accumulates the values $(I_{m2} - \sqrt{8} I_{od})^p$ derived for each time sample m and decisional block 368 compared the accumulated results to $GK_1'$ calculated in block 360. When the relationship of block 368 is satisfied, the trip governing signal is set in block 344; otherwise, the program execution is returned to the routine that called this subroutine. Accordingly, it should be kept in mind that the values of $K_1'$, $L'$ and $\Delta t$ will vary depending on whether the power system network is 50 Hz or 60 Hz.

Figure 20:
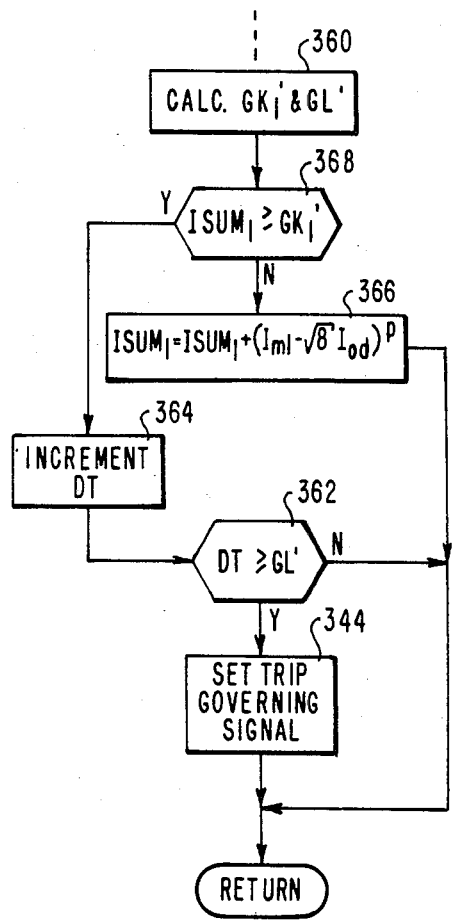
FIG. 20 depicts a portion of a flow chart diagram illustrating an alternate overcurrent algorithm.

In an alternative embodiment shown in FIG. 20, the sequence of the programmed instructional blocks may be rearranged such that the blocks 368 and 366 follows block 360 for deriving the N-$GL'$ time units as described in connection with equation (23) hereabove and thereafter, the overall time-to-trip is derived by delaying the additional $GL'$ time units in blocks 364 and 362. After the derived time-to-trip has elapsed, the trip governing signal is set in block 344 and program execution is returned to the initiating point.

Figure 21:
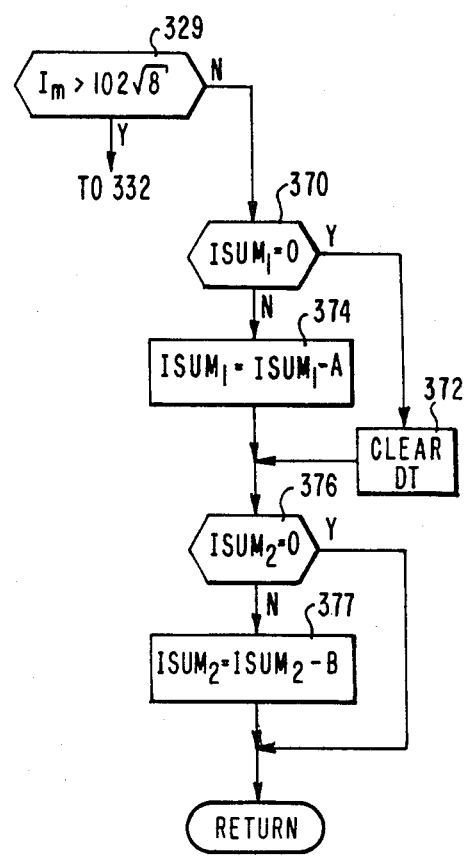
FIG. 21 depicts a portion of a flow chart diagram illustrating another alternate embodiment of an overcurrent algorithm.

In another alternate embodiment shown in FIG. 21, instead of clearing all of the working registers in block 330 following a negative decision of block 329, the accumulated results of registers ISUM$_1$ and ISUM$_2$ are decremented by predetermined constant values A and B, respectively, until they reach zero. More specifically, ISUM$_1$ is tested for zero value in block 370 following block 329. If equal to zero, register DT is cleared in block 372; otherwise, ISUM$_1$ is decremented by constant A in block 374. In either case, program execution continues at decisional block 376 wherein ISM$_2$ is tested for zero value; if not zero, then ISUM$_2$ is decremented by a constant B in block 377 and thereafter program execution is returned to the initiating point.

What is claimed is:

1. Programmed overcurrent protection control apparatus adaptable for use in a power system including a power line to govern the interruption of current through said power line based on a derived overcurrent time-to-trip associated with an overcurrent condition of said power line, said control apparatus comprising:

a programmed digital signal processor;

memory means, coupled to said programmed processor, for storing a plurality of digitally coded signals representative of predetermined derivation constants;

means for setting a plurality of derivation parameters;

means for measuring the current of said power line and generating a signal representative thereof;

means governed by said programmed processor to sample said current measurement signal at a plurality of first predetermined times during each frequency cycle of the power line current to effect sampled signals and to digitize said sampled signals;

said programmed processor operative over predetermined time intervals to derive for each predetermined time interval a digital signal, representative of a current value $I_m$ of a frequency cycle of the current contemporaneous with the corresponding predetermined time interval m, from the sampled signals digitized over the corresponding predetermined time interval;

said programmed processor operative at second predetermined times corresponding to said predetermined time intervals to read said derivation parameter settings;

said programmed processor operative to select certain of said digitally coded derivation constants from said memory means corresponding to said read parameter settings;

said programmed processor operative to detect an overcurrent condition from said derived digital current value signals;

said programmed processor operative, in response to the detection of an overcurrent condition, to derive an overcurrent time-to-trip based on the following relationship:

$$\left[ \sum_{m=1}^{N-G \cdot C2} (I_m - C1)^p \right] \geq G \cdot C3,$$

where m from 1 to N−G·C2 represent the predetermined time intervals during which said detected overcurrent condition persists;

> where G, P, C1, C2 and C3 represent digitally coded derivation constants based on said read parameter settings for each corresponding predetermined time interval m;
>
> where N represents the number of predetermined time intervals which may elapse for the time-to-trip and G·C2 represents a minimum number of predetermined time intervals for the time-to-trip;
>
> where $I_m$ represents the digital current value signal derived for the corresponding predetermined time interval m; and means for governing the interruption of current through said power line if said overcurrent condition persists for the duration of said time-to-trip derivation.

2. The apparatus in accordance with claim 1 wherein the measuring means includes:

current transformer coupled to said power line for electromagnetically generating a signal as a measure of the current of the power line;

an impedance network; and a set of current range selector switches coupled between said current transformer and said impedance network for altering the range of said current measurement signal.

3. The apparatus in accordance with claim 2 including a rectifier circuit for rectifying the current representative signal; wherein the set of current range selector switches is coupled between the rectifier and the impedance network; and wherein the impedance network comprises a resistor network.

4. The apparatus in accordance with claim 1 wherein the sampling and digitizing means includes an analog-to-digital converter having a limited input signal range for which to provide corresponding digitally-coded signals; and a ranging circuit for scaling the current measurement signal to within the input signal range of said analog-to-digital converter, both said analog-to-digital converter and said ranging circuit being operatively governed by said programmed processor at the first predetermined times.

5. The apparatus in accordance with claim 4 wherein the ranging circuit includes a plurality of range settings selectable for scaling the current measurement, and means for detecting when said scaled signal is beyond the input signal range of the analog-to-digital converter and for generating an overrange signal indicative thereof; and wherein the programmed processor is operative to monitor said overrange signal to effect a monitored overrange signal and to select a range setting by governing a sequencing through said plurality of range settings from the highest to the lowest based on said monitored overrange signal.

6. The apparatus in accordance with claim 1 wherein the setting means includes means for setting an overcurrent protection apparatus style number and means for setting a time dial reading; and wherein the programmed processor is operative to select a derivation constant G as a function of the read time dial readings and is operative to select the set of derivation constants C1, C2 and C3 from the memory means based on the read style number.

7. The apparatus in accordance with claim 1 including an automatic restart circuit for detecting a malfunction in the operation of the programmed processor and for restarting said operation at a predetermined operational point.

8. The apparatus in accordance with claim 7 including a power supply for supplying electrical energy to said apparatus at at least one voltage level; and means for detecting an undervoltage condition of said power supply and for generating an undervoltage signal indicative thereof; and wherein the automatic restart circuit includes means generated by said undervoltage signal to suspend processor operation during the generation of said undervoltage signal and to restart the processor operation at the predetermined operational point upon alleviation of said generation.

9. The apparatus in accordance with claim 1 wherein the programmed processor is operative, in response to the detection of an overcurrent condition, to determine if the digital current value signal derived for the predetermined time interval corresponding to the detected overcurrent condition is within an initial overcurrent range and if said determination is affirmative, to derive an overcurrent time-to-trip based on the following relationship:

$$\left[ \sum_{m=1}^{N} (I_m - C5) \right] \geq G \cdot C4,$$

where G and C4 represent digitally coded derivation constants based on said read parameter settings for said corresponding predetermined time interval, and C5 represents a fixed constant.

10. The apparatus in accordance with claim 9 wherein the setting means includes means for setting an overcurrent protection apparatus style number and means for setting a time dial reading; and wherein the programmed processor is operative to select a derivation constant G as a function of the read time dial readings correspondingly and is operative to select the derivation constant C4 from the memory means based on the read style number.

11. Programmed overcurrent protection control apparatus adaptable for use in a three phase power system including three power lines to govern the interruption of current through said power lines based on a derived overcurrent time-to-trip associated with an overcurrent condition of at least one of said power lines, said control apparatus comprising:

a programmed digital signal processor;

memory means, coupled to said programmed processor, for storing a plurality of digitally coded signals representative of predetermined derivation constants;

means for setting a plurality of parameters;

means for measuring current through said power lines and generating first, second and third signals respectively representative of said currents;

means governed by said programmed processor to sample said first, second and third current measurement signals at a plurality of first predetermined times during each frequency cycle of the corresponding power line current and to digitize said sampled first, second and third current measurement signals;

said programmed processor operative over predetermined time intervals to derive for each predetermined time interval first, second and third digital signals, each representative of a current value $I_m$ of a frequency cycle of its respective current contemporaneous with the corresponding predetermined time interval m, from their respective sampled current measurement signals digitized over the corresponding predetermined time interval;

said programmed processor operative at second predetermined times corresponding to said predetermined time intervals to read said parameter settings;

said programmed processor operative to select certain of said digitally coded derivation constants from said memory means corresponding to said read parameter settings;

said programmed processor operative to detect an overcurrent condition from said derived first, second and third digital current value signals;

said programmed processor operative, in response to the detection of an overcurrent condition, to derive an overcurrent time-to-trip based on the following relationship:

$$\left[ \sum_{m=1}^{N-G \cdot C2} (I_m - C1)^P \right] \geq G \cdot C3,$$

where m from 1 to $N-G \cdot C2$ represent the predetermined time intervals during which said overcurrent condition exists;

where G, P, C1, C2 and C3 represent digitally coded derivation constants based on said read parameter settings for said corresponding predetermined time interval m;

where N represents the number of predetermined time intervals which may elapse for the time-to-trip and G C2 represents a minimum number of predetermined time intervals for the time-to-trip;

where $I_m$ is the detected overcurrent digital current value signal derived for the corresponding predetermined time interval m; and means for governing the interruption of current through said power lines if said overcurrent condition persists for the duration of said time-to-trip derivation.

12. The apparatus in accordance with claim 11 wherein the apparatus includes a measuring means for each power line, each measuring means including:

current transformer coupled to said corresponding power line for electromagnetically generating a signal as a measure of the current of the power line;

an impedance network; and a set of current range selector switches coupled between said current transformer and said impedance network for altering the range of said current measurement signal.

13. The apparatus in accordance with claim 12 wherein each measuring means includes a rectifier circuit for rectifying its corresponding current measurement signal; wherein the set of current range selector switches of each measuring means is coupled between the corresponding rectifier and impedance network; and wherein the impedance networks each comprise a resistor network.

14. The apparatus in accordance with claim 11 wherein the sampling and digitizing means includes an analog signal multiplexer for selecting one of the first, second and third current measurement signals are governed by a digitally coded selection signal generated by the programmed processor; an analog-to-digital converter operatively governed by the programmed processor to digitize said selected current measurement signals, said converter having a limited input signal range for which to provide a corresponding digitally-coded signal; and a ranging circuit coupled between said analog signal multiplexer and analog-to-digital converter for scaling the selected current measurement signal to within the input signal range of said analog-to-digital converter as governed by a digitally coded range signal generated by the programmed processor.

15. The apparatus in accordance with claim 14 wherein the ranging circuit includes a plurality of range settings selectable for scaling the selected current measurement signal, and means for detecting when said scaled signal is beyond the input signal range of the analog-to-digital converter and for generating an overrange signal indicative thereof; and wherein the programmed processor is operative to monitor said overrange signal and to select a range setting by governing the range signal codes to sequence through said plurality of range settings from the highest to the lowest based on said monitored overrange signal.

16. The apparatus in accordance with claim 11 wherein the setting means includes means for setting an overcurrent protection apparatus style number and means for setting a time dial reading; and wherein the programmed processor is operative to select a derivation constant G as a function of the read time dial readings and is operative to select the set of derivation constants C1, C2 and C3 from the memory means based on the read style number.

17. The apparatus in accordance with claim 11 including an automatic restart circuit for detecting a malfunction in the operation of the programmed processor and for restarting said operation at a predetermined operational point.

18. The apparatus in accordance with claim 17 including a power supply for supplying electrical energy to said apparatus at at least one voltage level; and means for detecting an undervoltage condition of said power supply and for generating an undervoltage signal indicative thereof; and wherein the automatic restart circuit includes means generated by said undervoltage signal to suspend processor operation during the generation of said undervoltage signal and to restart the processor operation at the predetermined operational point upon alleviation of said signal generation.

19. The apparatus in accordance with claim 11 wherein the programmed processor is operative, in response to the detection of an overcurrent condition, to determine if the digital current value signal derived for the predetermined time interval corresponding to the detected overcurrent condition is within an initial overcurrent range and if said determination is affirmative, to derive an overcurrent time-to-trip based on the following relationship:

$$\left[ \sum_{m=1}^{N} (I_m - C5) \right] \geq G \cdot C4,$$

where G and C4 represent digitally coded derivation constants based on said read parameter settings for said corresponding predetermined time interval, and C5 represents a fixed constant.

20. The apparatus in accordance with claim 19 wherein the setting means includes means for setting an overcurrent protection apparatus style number and means for setting a time dial reading; and wherein the programmed processor is operative to select a derivation constant G as a function of the read time dial readings and is operative to select the derivation constant C4 from the memory means based on the read style number.

21. Method of governing the interruption of current through a power line of a power system network based on a derived overcurrent time-to-trip associated with an overcurrent condition of said power line, said method comprising the steps of:

(a) storing a plurality of digitally coded signals representative of predetermined derivation constants in a memory of a digital signal processing system;

(b) setting a plurality of derivation parameters;

(c) measuring the current of said power line and generating a signal representative thereof;

(d) sampling and digitizing said current measurement signal at a plurality of first predetermined times during each frequency cycle of the power line current as governed by a programmed digital signal processor of said processing system;

(e) operating said programmed processor over predetermined time intervals to derive for each predetermined time interval a digital signal, representative of a current value $I_m$ of a frequency cycle of the power line current contemporaneous with the predetermined time interval m, from the sampled and digitized current measurement signals of said corresponding predetermiend time interval;

(f) operating said programmed processor at second predetermined times corresponding to said predetermined time intervals to read said parameter settings;

(g) operating said programmed processor to select certain of said digitally coded derivation constants from said memory means corresponding to said read parameter settings;

(h) operating said programmed processor to detect an overcurrent condition from said derived digital current value signal $I_m$;

(i) operating said programmed processor in response to the detection of an overcurrent signal to derive an over-current time-to-trip by:

(1) accumulating the quantities $(I_m - C1)^p$ for each predetermined time interval m during the time that the overcurrent condition persists, until the value of said accumulated quantities becomes greater than or equal to $G \cdot K_1'$, and (2) delaying for $G \cdot L'$ additional predetermined time intervals for which said overcurrent condition persists, where G, P, C1, $K_1'$ and L' represent derivation constants based on said read parameter settings for each corresponding predetermined time interval m; and (j) governing the interruption of said current through said power line if said overcurrent condition persists for the duration of said time-to-trip derivation.

22. The method in accordance with claim 21 including the steps:

(k) operating the programmed processor to detect if the derived digital current value signal $I_m$ for an overcurrent condition is within an initial overcurrent range; and (l) operating the programmed processor upon the detection of step (k) to suspend the derivation of the time-to-trip acccording to step (i) and to derive the overcurrent time-to-trip by accumulating the quatities $(I_m = C2)$ for each predetermined time interval m during the time the overcurrent condition persists until the value of said accumulated quantities becomes greater than or equal to $G \cdot K_2'$, where $K_2'$ represents a derivation constant based on the read parameter settings for each corresponding time interval m and C2 represents a fixed constant.

23. The method in accordance with claim 22 including the steps of:

(m) operating the programmed processor to detect if the derived digital current value signal $I_m$ for an overcurrent condition is outside the initial overcurrent range;

(n) operating the programmed processor upon the detection of step (m) to set a variable digital signal $I_{m2}$ to an upper boundary current value of the initial overcurrent range and to derive the overcurrent time-to-trip in accordance with method step (l) using $I_{m2}$, except the derivation of (l) being performed concurrent with the derivation of step (i).

24. The method in accordance with claim 22 including the step of operating the programmed processor under normal current conditions to set the values of the accumulated quantities of steps (i) and (l) to zero.

25. The method in accordance with claim 22 including the step of operating the programmmed processor under normal current conditions to decrement the values of accumulated quantities of $(I_m - C1)^p$ and $(I_m - C2)$ respectively corresponding to steps (i) and (l) with respective constant values at each predetermined time interval until one of a plurality of events occur, said plurality including a value of a corresponding accumulated quantity reaching zero and an overcurrent condition arising.

* * * * *